(12) United States Patent
Yoneda et al.

(10) Patent No.: US 7,864,224 B2
(45) Date of Patent: Jan. 4, 2011

(54) IMAGE PICKUP APPARATUS AND IMAGE PICKUP METHOD

(75) Inventors: Shigeru Yoneda, Tokyo (JP); Shuichiro Matsushima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 696 days.

(21) Appl. No.: 11/460,416

(22) Filed: Jul. 27, 2006

(65) Prior Publication Data

US 2007/0024735 A1 Feb. 1, 2007

(30) Foreign Application Priority Data

Jul. 29, 2005 (JP) ............................. 2005-221465

(51) Int. Cl.
*H04N 5/76* (2006.01)
*H04N 5/222* (2006.01)
*G06F 3/00* (2006.01)

(52) U.S. Cl. .............. 348/231.2; 348/231.3; 348/231.5; 348/231.7; 348/333.02; 715/707

(58) Field of Classification Search ............ 348/333.12, 348/231.3, 231.2, 231.5, 231.6, 231.7, 231.9, 348/333.01, 333.02; 715/707; 707/999.2, 707/999.203

See application file for complete search history.

(56) References Cited

U.S. PATENT DOCUMENTS

| | | | | |
|---|---|---|---|---|
| 6,683,649 | B1 * | 1/2004 | Anderson | 348/333.05 |
| 7,421,196 | B2 * | 9/2008 | Funazaki | 396/429 |
| 7,573,509 | B2 * | 8/2009 | Shiraishi | 348/231.2 |
| 7,656,451 | B2 * | 2/2010 | Yanagi | 348/333.11 |
| 2003/0236797 | A1 * | 12/2003 | Nita | 707/200 |
| 2004/0109062 | A1 * | 6/2004 | Yamaya | 348/207.1 |
| 2004/0131282 | A1 * | 7/2004 | Yoshida et al. | 382/312 |
| 2006/0028553 | A1 * | 2/2006 | Mori et al. | 348/207.99 |
| 2006/0092312 | A1 * | 5/2006 | Tanaka | 348/340 |
| 2008/0297638 | A1 * | 12/2008 | Hiratsuka | 348/333.02 |

FOREIGN PATENT DOCUMENTS

| | | |
|---|---|---|
| JP | 10-178584 | 6/1998 |
| JP | 2000-165736 A | 6/2000 |
| JP | 2002-101330 A | 4/2002 |
| JP | 2002-452567 | 5/2002 |
| JP | 2003-224812 A | 8/2003 |
| JP | 2003-319327 A | 11/2003 |
| JP | 2004-086004 A | 3/2004 |
| JP | 2004-363825 A | 12/2004 |

* cited by examiner

*Primary Examiner*—Lin Ye
*Assistant Examiner*—Marly Camargo
(74) *Attorney, Agent, or Firm*—Canon U.S.A., Inc. I.P. Division

(57) ABSTRACT

An image pickup apparatus includes an image pickup unit adapted to pickup a moving image, a shooting condition storage unit adapted to store shooting conditions to be used in the image pickup unit, an instruction unit adapted to issue a shooting condition read instruction during moving image shooting by the image pickup unit, a display unit adapted to, when the read instruction has been issued from the instruction unit, display information associated with the shooting conditions stored in the shooting condition storage unit, a selection unit adapted to select a desired shooting condition from information associated with the shooting conditions displayed on the display unit, and a setting unit adapted to set the shooting condition selected by the selection unit.

9 Claims, 27 Drawing Sheets

FIG. 4

[CUSTOM PRESET FILE]

| | |
|---|---|
| NAME | = "PRESET_1" |
| GAMMA | = NORMAL |
| SHARPNESS | = 2 |
| NOISE REDUCTION | = OFF |
| COLOR PHASE | = -1 |
| R GAIN | = -1 |
| G GAIN | = 2 |
| B GAIN | = 3 |

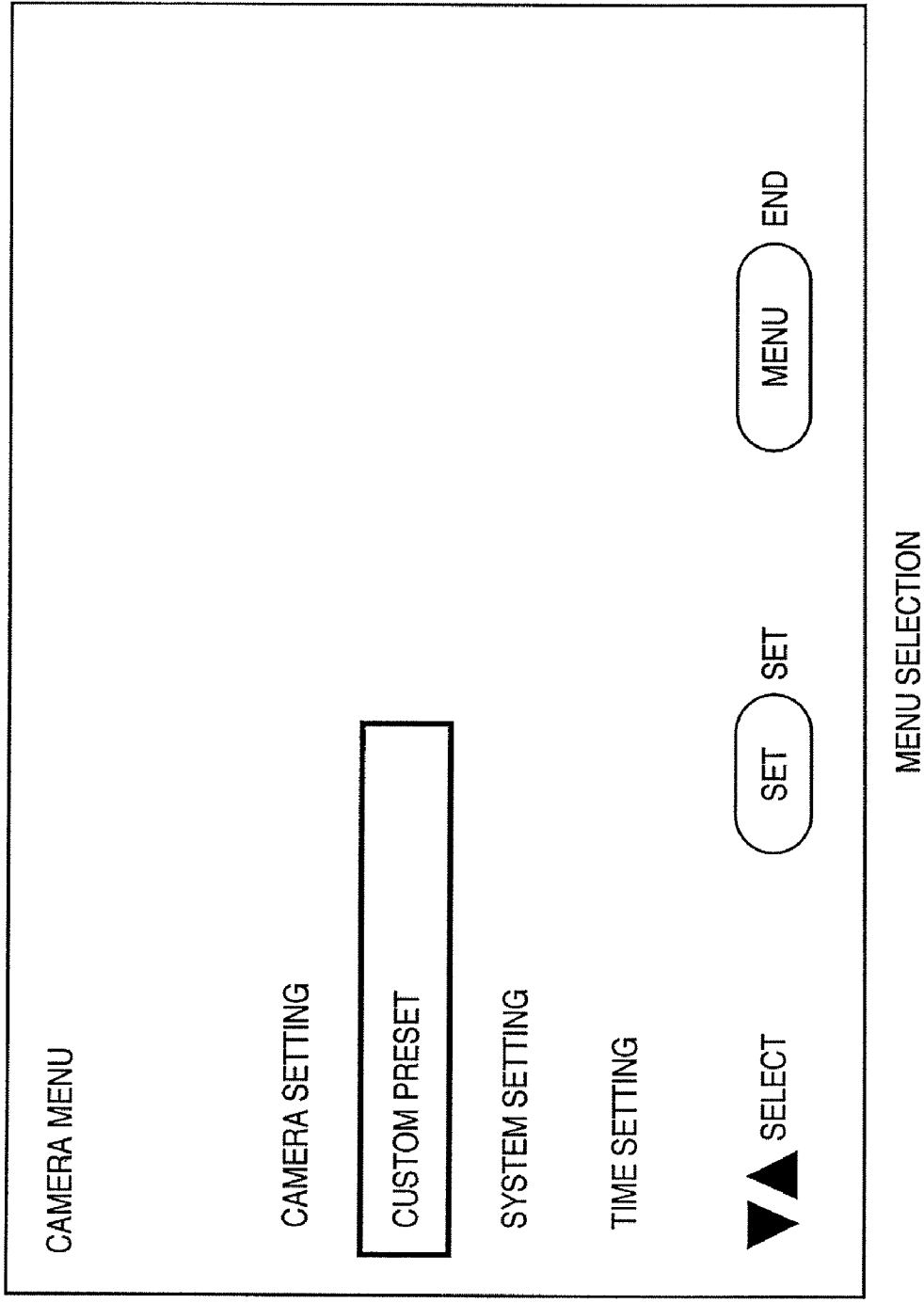

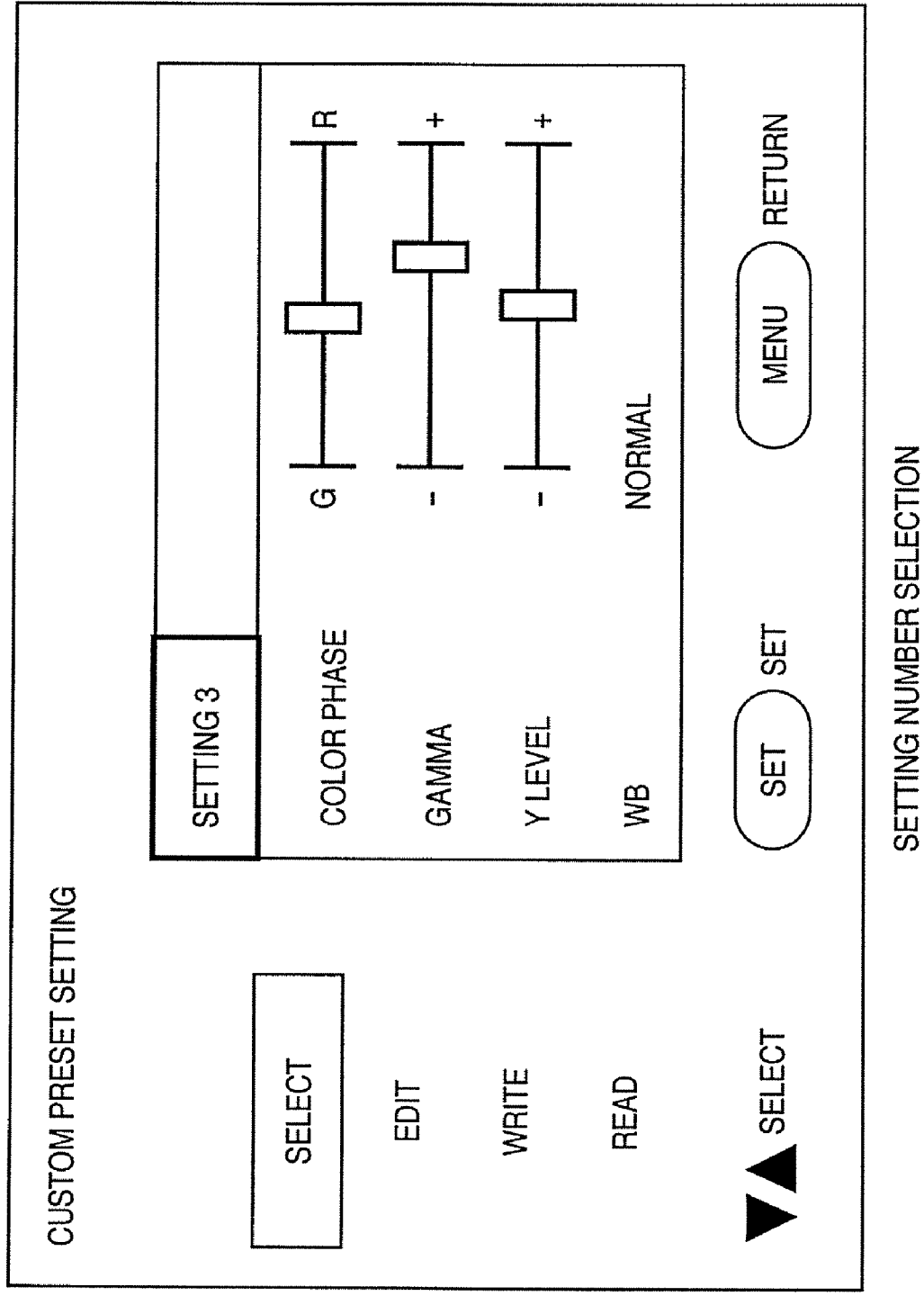

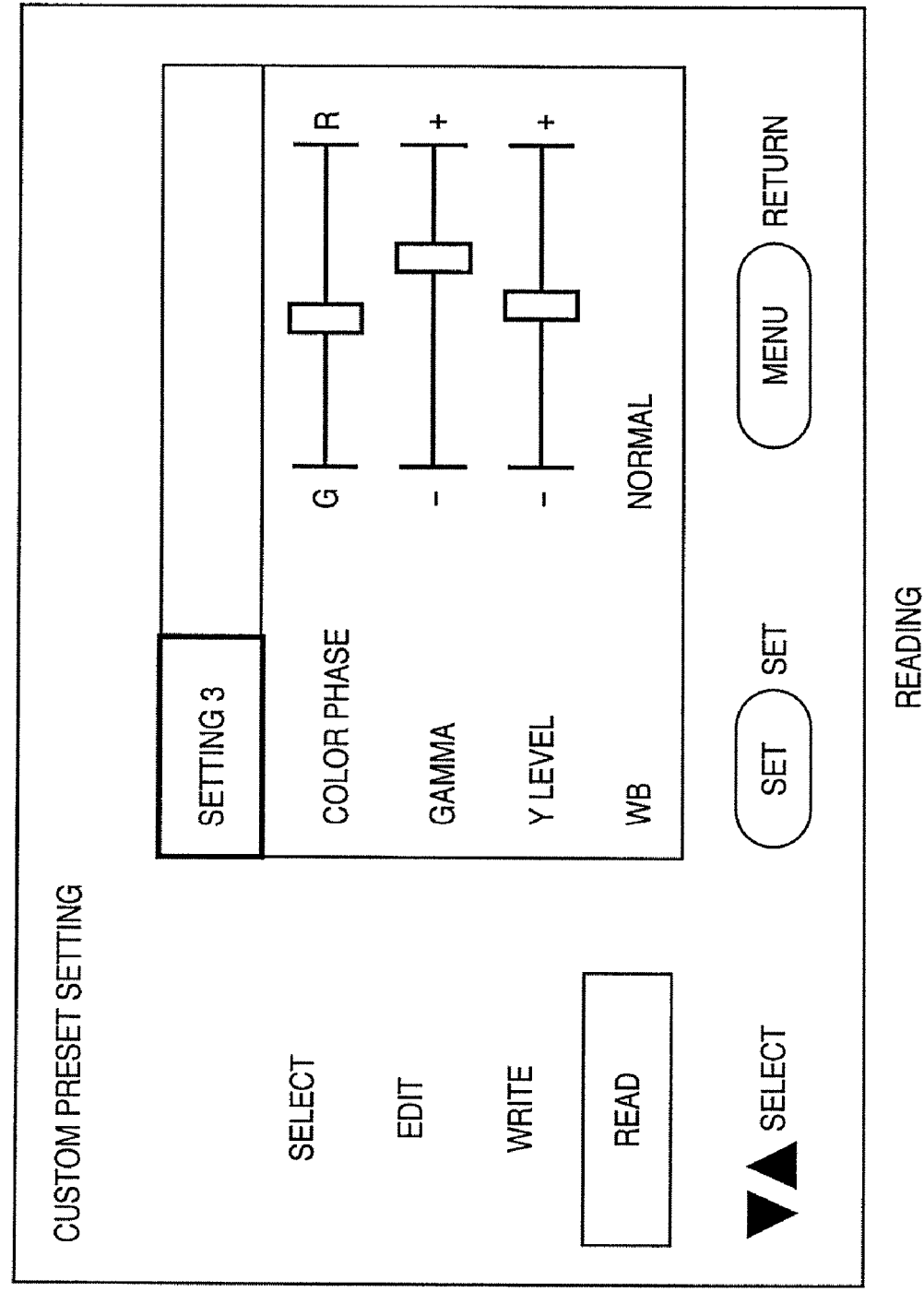

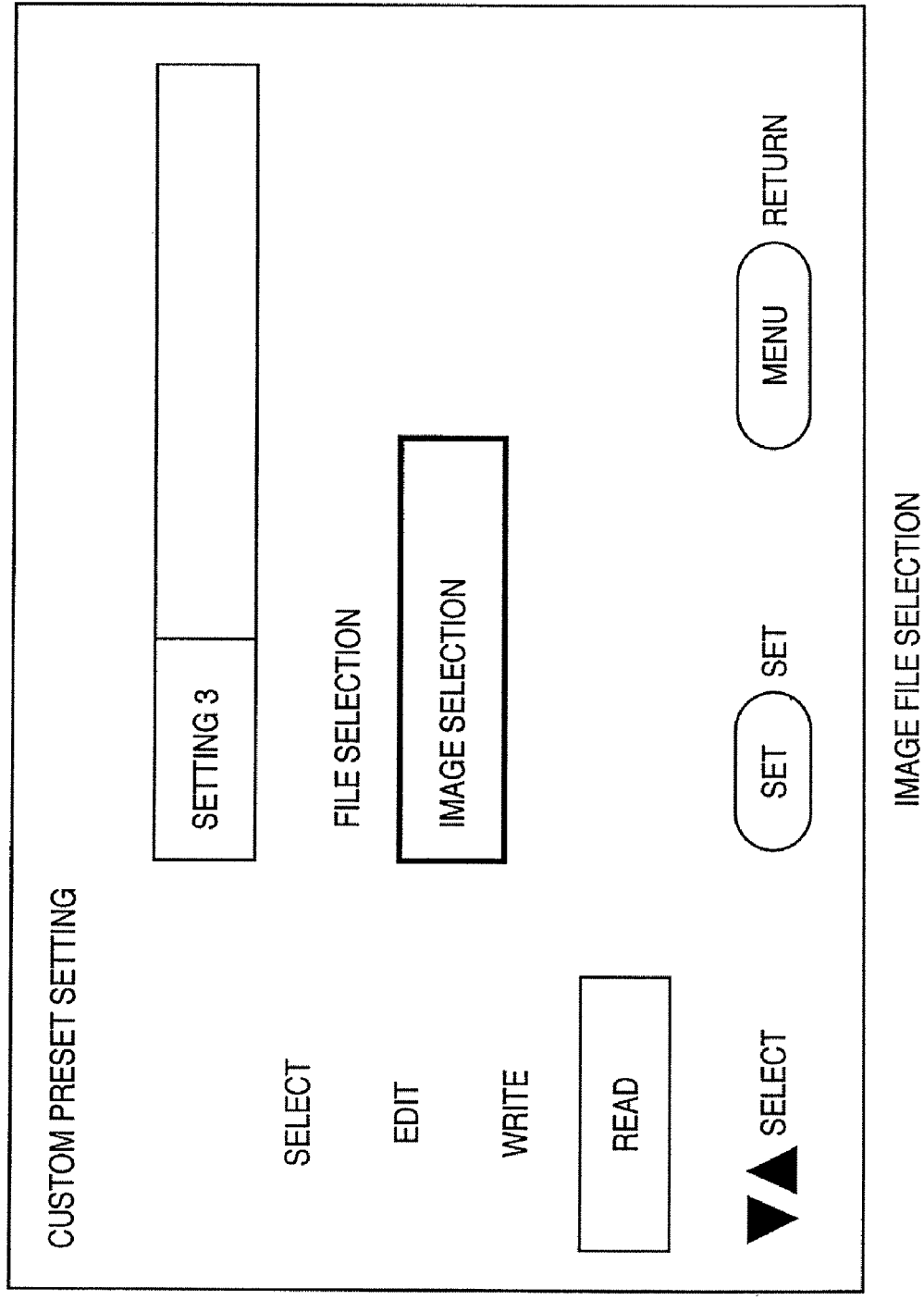

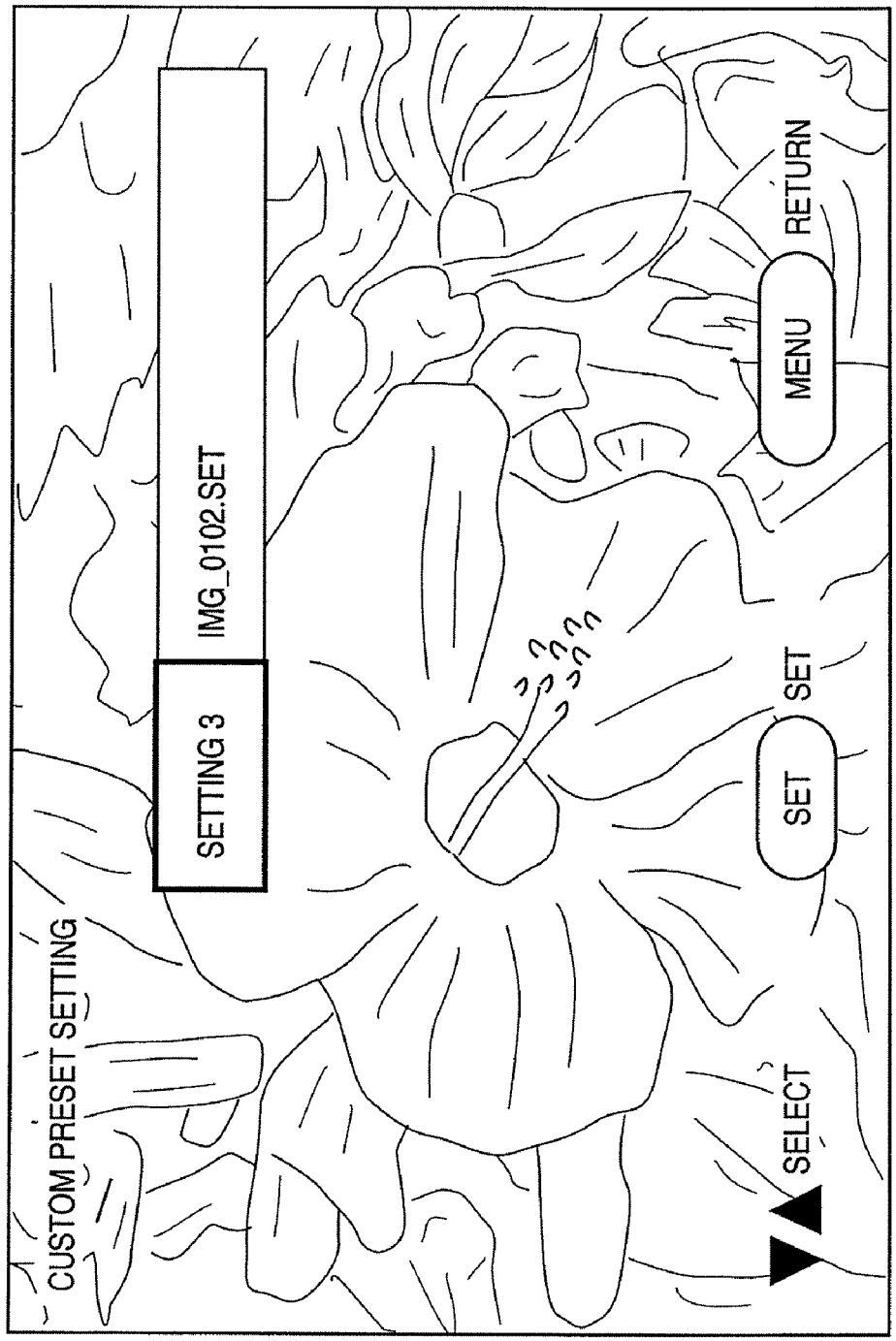

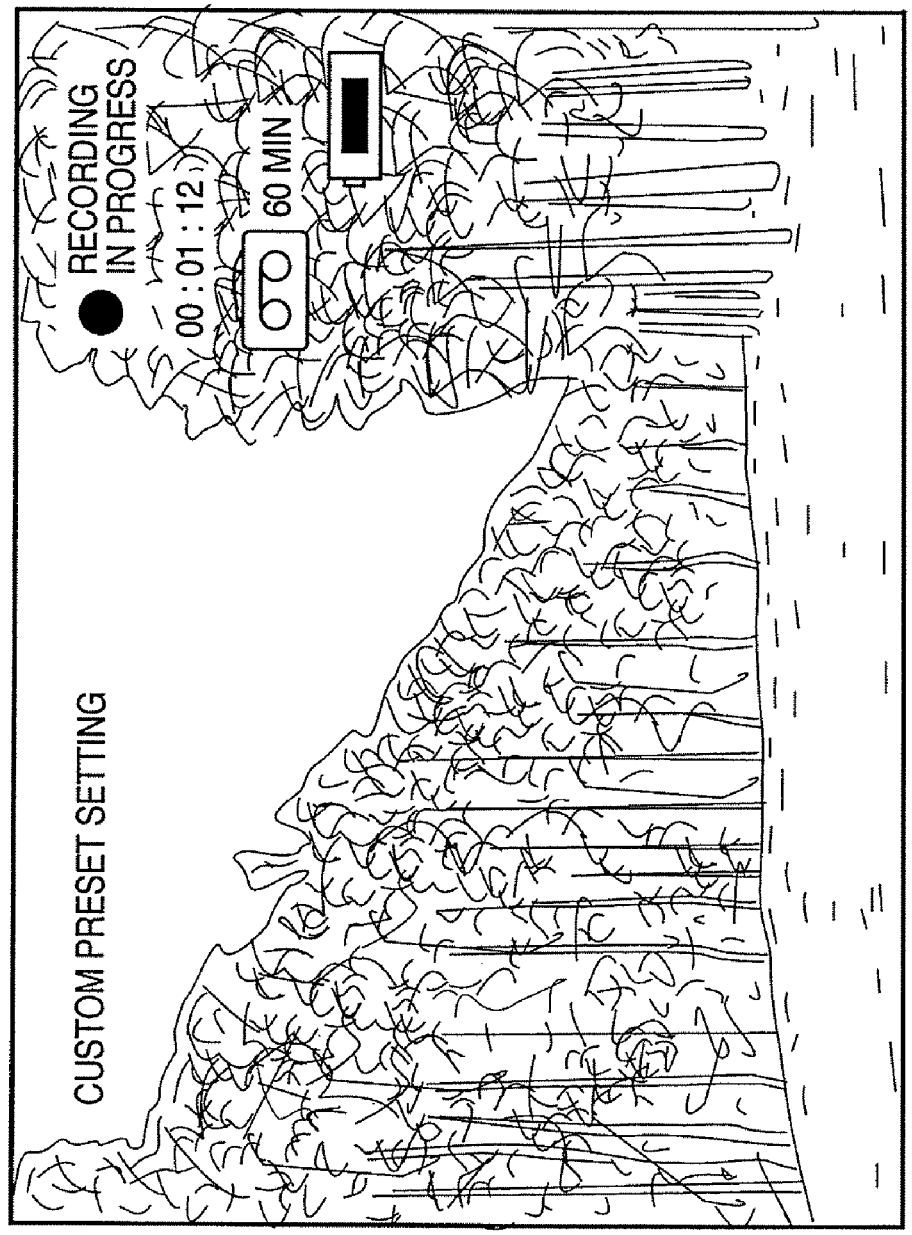

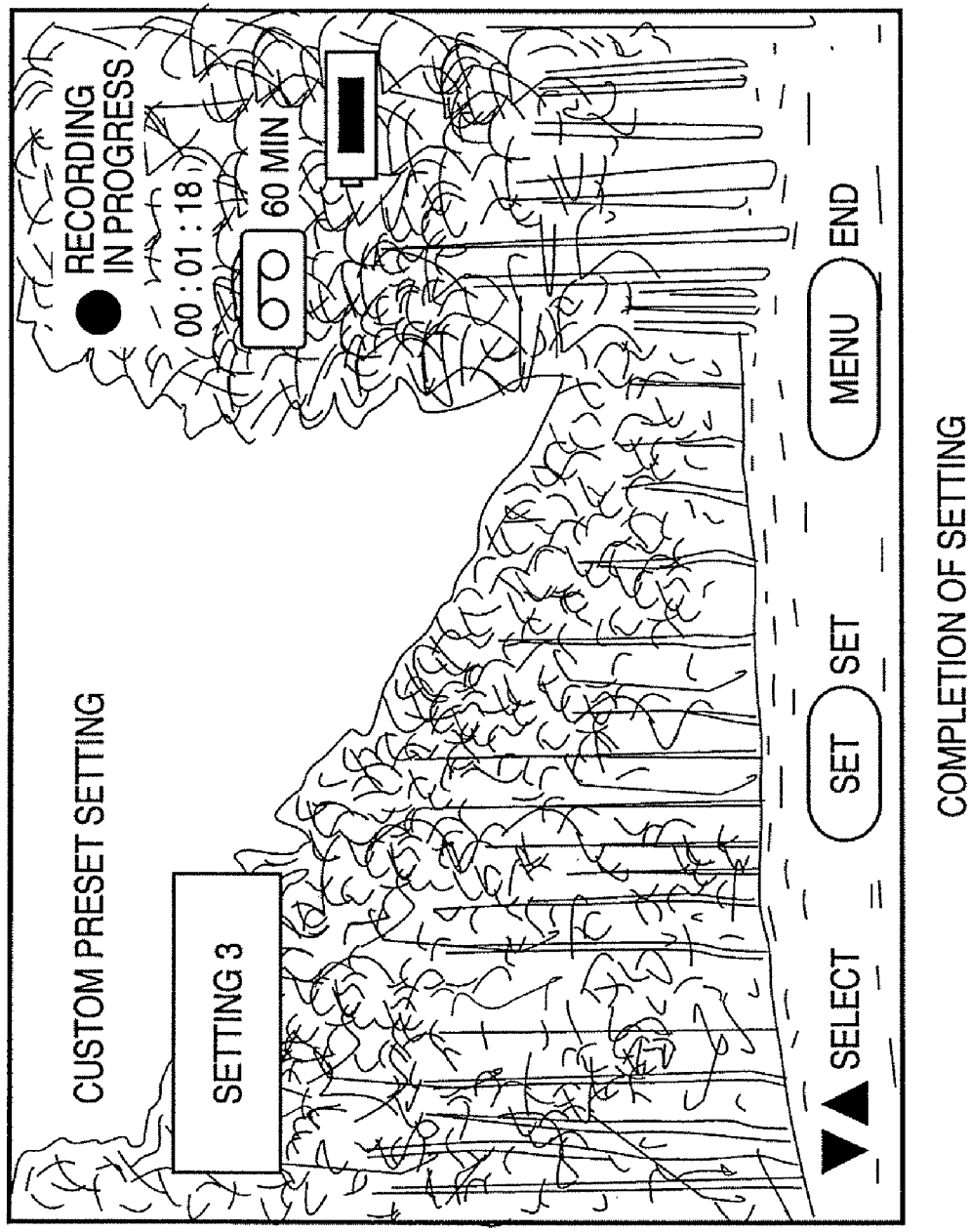

IMAGE PICKUP APPARATUS AND IMAGE PICKUP METHOD

BACKGROUND OF THE INVENTION

1. Field of the Invention

The present invention relates to a technique for setting moving image/still image shooting conditions.

2. Description of the Related Art

Image pickup apparatuses such as digital video cameras or digital still cameras (to be referred to as digital cameras hereinafter) capable of shooting a moving image or still image allow the user to set various shooting conditions. The shooting conditions include, e.g., zoom, shutter speed, stop, focus, gain adjustment process for a signal output from an image sensing device, and white balance process of adjusting color mixture balance so as to exactly reproduce white portions of the object of interest. The number of items which can be set as shooting conditions are increasing along with the improvement of a digital image processing techniques. To cope with this trend, digital cameras which allow the user to set various parameters such as color gain, color phase, sharpness, and gamma are under development.

Under these circumstances, separately setting parameters for such items complicates the operations involved. It is also impractical to separately store these parameters in consideration of restoring them to values set once in the past. To solve these problems, there have been proposed techniques for storing, as a set of shooting conditions, a combination of individual parameters concerning a plurality of items and reading out the set of the shooting conditions in shooting so as to facilitate setting.

For example, Japanese Patent Application Laid-Open No. 10-178584 proposes a technique for creating a table in which image data to be recorded is registered in association with shooting conditions and displaying an image corresponding to shooting conditions to be selected by the user so as to facilitate shooting condition selection.

In general, like an Exif format, image data generated and recorded by a digital camera partially records shooting conditions of a picked-up image in its header portion.

As described above, digital video cameras have a function of automatically setting the tint and color tone of a moving image to optimum values. Some types of digital video cameras also have a shooting scene-specific setting modes so as to automatically set a tint and color tone which are suitable for the scene of interest for each mode. This function allows even a beginner inexperienced in video camera operation to easily use such device.

On the other hand, users such as professionals and advanced amateurs desire a function capable of changing moving image shooting parameters not automatically but manually in order to reflect his/her specific intentions. To meet this demand, some middle- or high-grade digital cameras allow the user to change moving image shooting parameters. The moving image shooting parameter setting items include color phase, sharpness, color gain, and white balance. Storing/saving a combination of such a plurality of parameters makes it possible to save the user from re-setting them when the same settings are to be adopted the next time. However, these moving image shooting parameters are often expressed by numerical values. To reuse them, the user needs to confirm the individual parameter setting values on a parameter setting window. This complicates the user's operations. To solve this problem, it is demanded to improve that function so that the user can readily image the parameter setting contents. For example, Japanese Patent Application Laid-Open No. 2002-152567 achieves re-setting of shooting conditions, under which a still image has been picked-up, by selecting that still image.

Unfortunately, in Japanese Patent Application Laid-Open No. 10-178584, as the number of choices of a set of shooting conditions increases, shooting condition selection itself becomes troublesome when a certain set of shooting conditions is to be reused in moving image shooting. Therefore, even though shooting conditions are associated with image data so as to facilitate selection, the number of choices cannot greatly be increased. Additionally, when a table has registered shooting conditions to its maximum capacity, if the user wants to register another shooting condition, some condition must be deleted so as to overwrite the other one on the obtained space. This inconveniences the user if he/she wants to temporarily register certain shooting conditions in shooting or to select desired ones after testing various conditions.

The method of recording shooting conditions of image data at its header portion like an Exif format cannot separately manage the image data and the shooting conditions. Therefore, if the user wants to open image data itself to the public, he/she must convert it using a dedicated tool. Still worse, a method of collectively managing shooting conditions themselves is unavailable at present.

The present invention has been made in consideration of the above problems, and has as its object to realize a technique for facilitating recording/management/reuse of shooting conditions.

When the user executes moving image shooting which requires a long recording time unlike still image shooting, he/she sometimes changes the parameter settings during shooting. In this case, a method of reading and changing preset parameters may be adopted. However, the method of selecting an image to set and change parameters as disclosed in the above-described Japanese Patent Application Laid-Open No. 2002-152567 complicates the operations involved during moving image shooting even though convenience for still image shooting is assured. That is, as a parameter setting image or menu window is displayed on an image display unit, it hides a moving image during shooting. This worsens the complexity of the operations involved.

SUMMARY OF THE INVENTION

The present invention has been made in consideration of the above problems, and has as its object to realize a technique for, when moving image shooting parameters are to be set, selecting a still image associated with them so as to easily select desired parameters.

In order to achieve the above object, there is provided an image pickup apparatus comprising: an image pickup unit adapted to pickup a moving image; a shooting condition storage unit adapted to store shooting conditions to be used in the image pickup unit; an instruction unit adapted to issue a shooting condition read instruction during moving image shooting by the image pickup unit; a display unit adapted to, when the read instruction has been issued from the instruction unit, display information associated with the shooting conditions stored in the shooting condition storage unit; a selection unit adapted to select a desired shooting condition from information associated with the shooting conditions displayed on the display unit; and a setting unit adapted to set the shooting condition selected by the selection unit.

There is also provided an image pickup method comprising: an image pickup step of picking up a moving image; a shooting condition storage step of causing a storage unit to store shooting conditions to be used in the image pickup step;

an instruction step of issuing a shooting condition read instruction during moving image shooting in the image pickup step; a display step of, when the read instruction has been issued in the instruction step, displaying information associated with the shooting conditions stored in the storage unit; a selection step of selecting a desired shooting condition from information associated with the shooting conditions displayed in the display step; and a setting step of setting the shooting condition selected in the selection step.

The present invention includes a program for causing a computer to execute the image pickup method, and a computer-readable recording medium which stores the program.

According to the present invention, the degree of freedom for handling shooting conditions recorded in association with image data can be increased so as to allow the user to manage and reuse the shooting conditions by simple operations.

Also, shooting conditions desired to be set can be easily selected by selecting image data associated with them. Furthermore, shooting condition file data is temporarily held in a storage unit so as to display only the shooting condition file name. This makes it possible to change the shooting conditions even during moving image shooting.

Further features of the present invention will become apparent from the following description of exemplary embodiments (with reference to the attached drawings).

BRIEF DESCRIPTION OF THE DRAWINGS

FIG. 4 is a view illustrating a shooting condition file according to the embodiment;

FIGS. 18A to 18G are views illustrating user interface windows in copying a parameter setting file from a memory medium on a camera-side memory; and FIGS. 19A to 19C are views illustrating user interface windows to read out parameter data during moving image shooting to set that data as moving image shooting parameters.

DESCRIPTION OF THE EMBODIMENTS

Preferred embodiments of the present invention will be described in detail below with reference to the accompanying drawings.

Note that the embodiments to be described hereinafter are examples implemented the present invention, and should be appropriately modified or changed in accordance with various conditions and the arrangement of an apparatus to which the present invention is applied. Therefore, the present invention is not limited to the following embodiments.

First Embodiment

Figure 1:
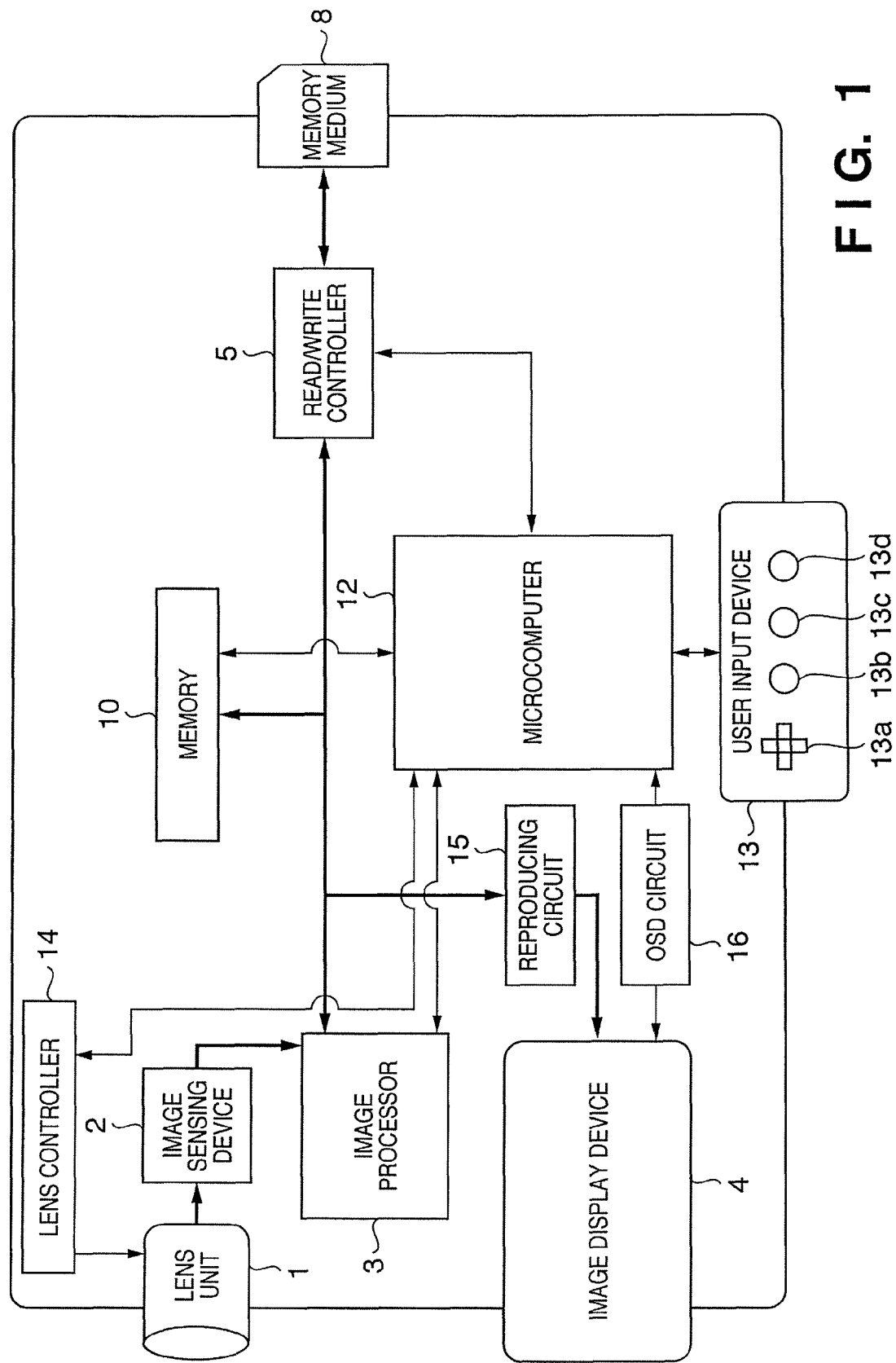
FIG. 1 is a block diagram showing the arrangement of an image pickup apparatus according to an embodiment of the present invention.

FIG. 1 is a block diagram showing the arrangement of an image pickup apparatus according to an embodiment of the present invention.

Referring to FIG. 1, a lens unit 1 comprises a shooting lens, a stop, and a motor to drive them. An image sensing device 2 such as a CCD forms an optical image of an object guided into the lens unit 1 on the image sensing plane and converts that image into an electrical signal. An image processor 3 executes a predetermined image interpolation process and color conversion process for data obtained by A/D-converting the electrical signal obtained by the image sensing device 2, and thereby generates digital image data. The image processor 3 further executes a predetermined arithmetic process using the sensed image data. On the basis of the obtained arithmetic result, the image processor 3 still further executes an AWB (Auto White Balance) process of TTL scheme. The image data is displayed on an image display device 4 via a data bus and so becomes recognizable as a picked-up image.

A lens controller 14 controls the lens unit 1. A microcomputer 12 comprises a CPU, ROM, and RAM and controls the overall apparatus. A user input device 13 is used to input a command to the microcomputer 12 by the user's operation. The user input device 13 comprises an operation key which allows the user to operate the image pickup apparatus.

The user input device 13 includes a cross key 13a and menu key 13b. The cross key 13a is used for menu selection and cursor movement on a display window. The menu key 13b is used for a shift to a menu window. The user input device 13 also includes a set key 13c and preset key 13d. Te set key 13c is used to select and determine a menu. The preset key 13d is used to invoke a camera parameter setting menu.

A memory 10 holds shooting conditions (parameters) set by the user. Reference numeral 8 denotes a memory. A read/write controller 5 controls to read/write image data from/in the memory medium 8. The read/write controller 5 controls a communication protocol with the memory medium 8, and accesses the memory medium 8 under the control of the microcomputer 12 to read/write the data. A reproducing circuit 15 reproduces the image data recorded on the memory medium 8. Reference numeral 4 denotes the image display unit such as an LCD. An OSD (On Screen Display) circuit 16 displays a menu or the like using a character or picture on the image display device 4 under the control of the microcomputer 12.

The image display device 4 provides a user interface together with the user input device 13. The user can operate the user input device 13 to set shooting conditions in accordance with the menu displayed on the image display device 4.

The set shooting conditions are set as control parameters or signal processing parameters in the image processor 3. The control parameters are used to control the lens unit 1 to a desired state via the lens controller 14. These parameters can be held in the memory 10 and can also be saved in the memory medium 8. To the contrary, these parameters can be read out from the memory medium 8 and sent to the image processor 3 and lens controller 14.

In image shooting, an electrical signal obtained by the image sensing device 2 is converted by the image processor 3 into image data in a format suitable for recording it on the memory medium 8, and is saved in the memory medium 8. The image data saved in the memory medium 8 is displayed on the image display device 4 via the reproducing circuit 15.

Figure 2:
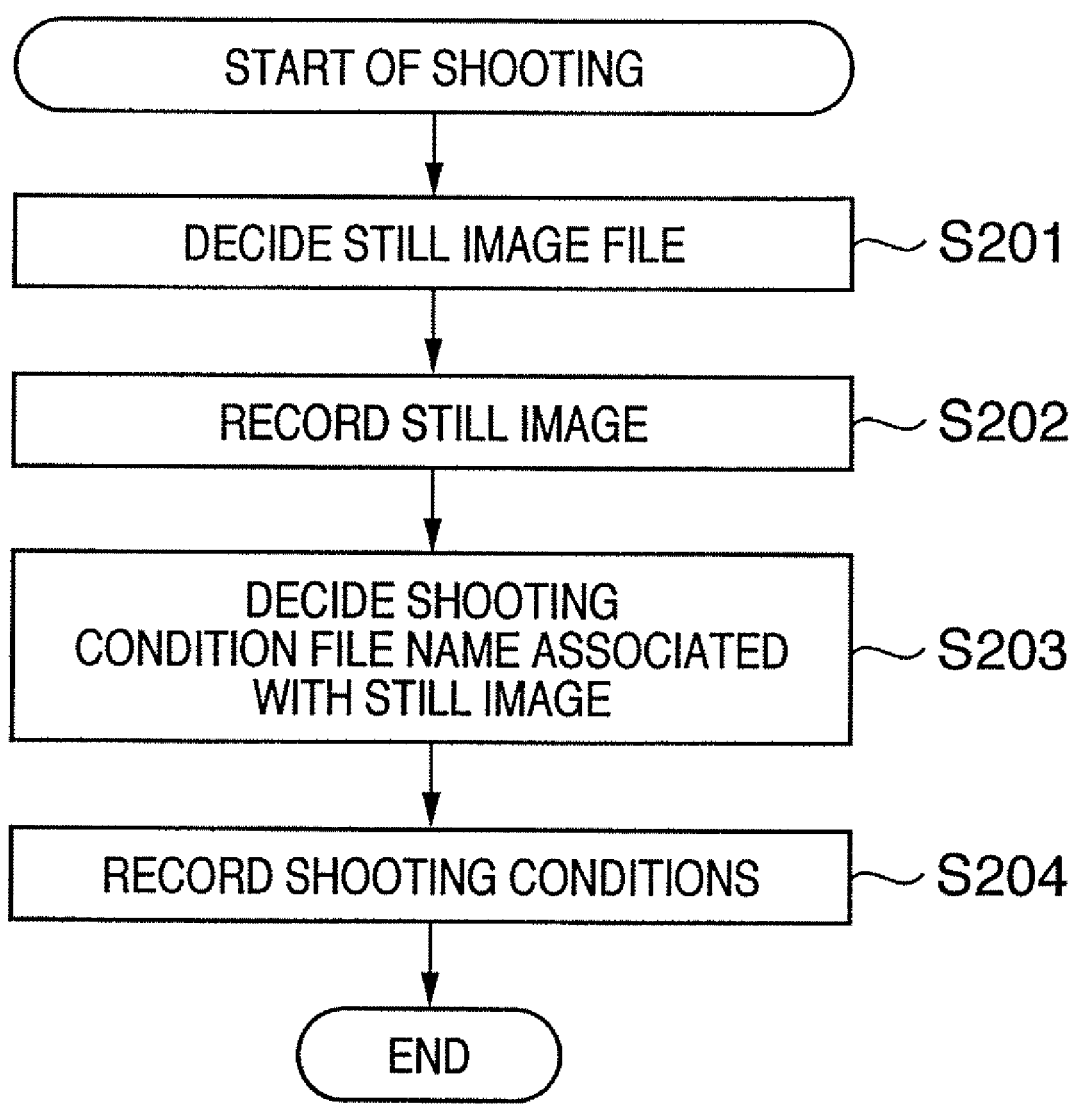
FIG. 2 is a flowchart showing an image data/shooting condition recording operation.

FIG. 2 is a flowchart showing an image data/shooting condition recording operation on the memory medium 8.

Referring to FIG. 2, when the user executes a predetermined operation for a picked-up image (e.g., a still image) via the user input device 13, the microcomputer 12 determines an image file name which can be discriminated from previously recorded image files, in accordance with that operation, e.g., a specific rule to be described later with reference to FIG. 3 (S201).

The microcomputer 12 records an image file (S202) next. After that, by using a character string to discriminate that image file from the other files out of character strings in that image file name, the microcomputer 12 determines a file name concerning shooting conditions in shooting (S203). The microcomputer 12 generates and records, using the file name determined in step S203, a shooting condition file associated with the image file (S204).

The processing order of steps S202 to S204 is not limited to the above case. The process in step S202 may be performed between the processes in steps S203 and S204. Alternatively, the process in step S202 may be performed after the process in step S204.

The start of the flow in FIG. 2 may be triggered by an instruction, which is issued via the user input device 13, to record a picked-up image or to record a picked-up image and shooting conditions in association with each other. Instead, the start of that flow may be triggered by a moving image shooting start instruction, or that flow may start simultaneously with or before or after the start of moving image shooting. Alternatively, the flow in FIG. 2 may start upon deciding shooting conditions so as to record a combination of the picked-up image data and shooting conditions at that point.

Figure 3:
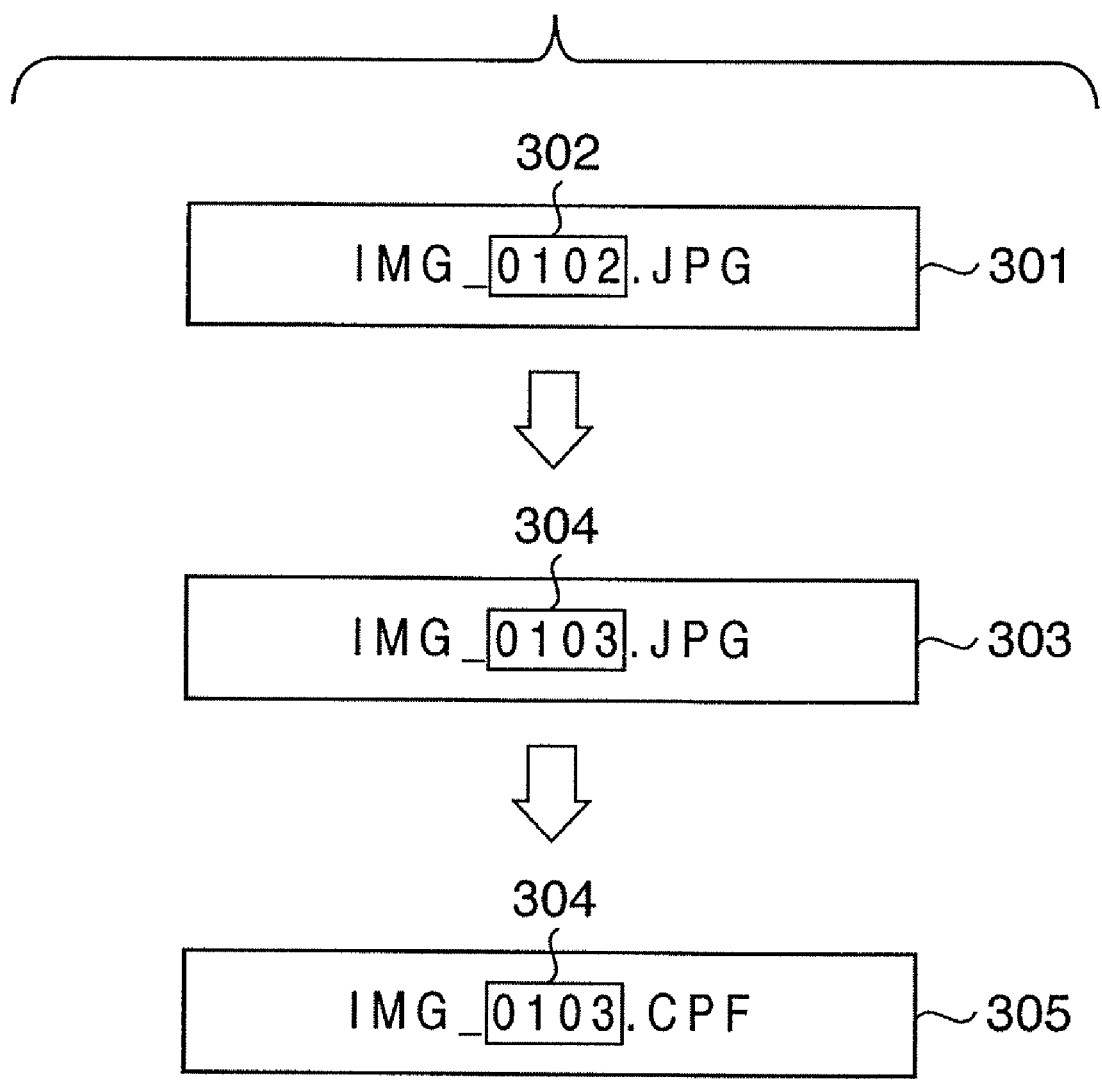
FIG. 3 is a view illustrating a file name determination rule in FIG. 2.

FIG. 3 is a view illustrating a rule used to determine the image file name in step S201, and a rule used to determine the shooting condition file name in step S203 of FIG. 2.

Referring to FIG. 3, a file name 301 is a file name previously recorded on the memory medium 8. A character string 302 is a serial number to specify each image. Before image shooting, searching in advance for a file which is recorded on the memory medium 8 and has a maximum serial number makes it possible to identify the character string 302.

In step S201 of FIG. 2, a character string 304 is determined as a file name 303. The character string 304 is given as a numerical value obtained by adding one to a numerical value expressed by the character string 302. Even in step S203 of FIG. 2, the character string 304 is determined as a file name 305. In the example of the file name 305 shown in FIG. 3, the so-called extension of the file name is changed from "JPG" which indicates a still image to "CPF" using the initial word of Custom Preset File, which expresses a shooting condition file uniquely set by the user in advance.

In this case, holding the character string 302 which identifies the image file in the memory 10 of FIG. 1 makes it possible to manage its serial number even at the time of replacing the memory medium. A general file system such as DCF adopts the concept of a directory which is a collection of files. In this case, it suffices as long as a file name is determined uniquely to each directory, because files belonging to different directories can be discriminated from each other even if they have the same file name.

Of character strings in the file name 303, characters other than the character string 304 need not always form a fixed character string as long as they indicate that the file of interest is an image file.

Of character strings in the file name 305, characters other than the character string 304 need not always form a fixed character string as long as they indicate that the file of interest is a shooting condition file.

FIG. 4 is illustrates a shooting condition file according to this embodiment.

Parameters such as a file name, gamma, sharpness are described in the shooting condition file using ASCII character strings. Although a text file is exemplified here, it suffices as long as the shooting condition file takes a format according to a rule set in advance so as to allow the image pickup apparatus to read/write its contents. For example, even if the shooting condition file uses binary data of the values of respective items, it plays its original role as long as that data expresses the identical contents.

Figure 5:
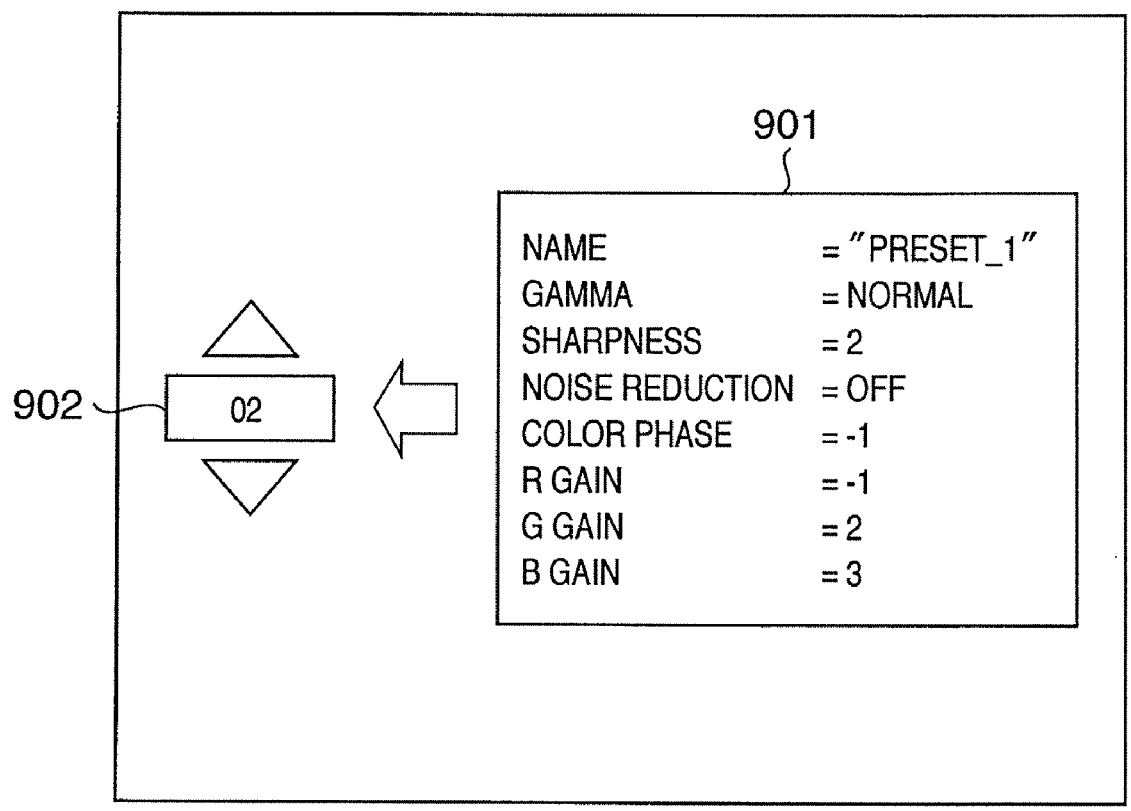
FIG. 5 is a view illustrating a user interface window to register a shooting condition file recorded in image shooting, as a choice of shooting conditions which is selectable in another shooting.

FIG. 5 illustrates a user interface window to register a shooting condition file recorded in image shooting, as a choice of shooting conditions which is selectable in another shooting.

When a picked-up image is to be reproduced, if a shooting condition file associated with an image file in accordance with the rule shown in FIG. 3 exists, the user issues a "register" instruction via the user input device 13. A window shown in FIG. 5 is then displayed on the image display device 4. The contents of shooting conditions are displayed in a field 901. The picked-up image may be kept displayed against the background of them. This makes it possible to visually confirm, using various parameters of the shooting conditions, how the image can be picked-up.

The numerical value of a numerical value display portion 902 is increased or decreased by operating the cross key 13a to select a number to be registered. The number selected here is used as the number of a choice which is selectable in shooting. For example, 01 to 20 may be assumed to be selectable so as to limit the number of choices in shooting.

The registered shooting conditions can be recorded in a memory incorporated in a camcorder. Alternatively, the registered shooting conditions can be saved in a file format with a file name containing a selected number such as PRESET01.CPF as a character string.

Figure 6:
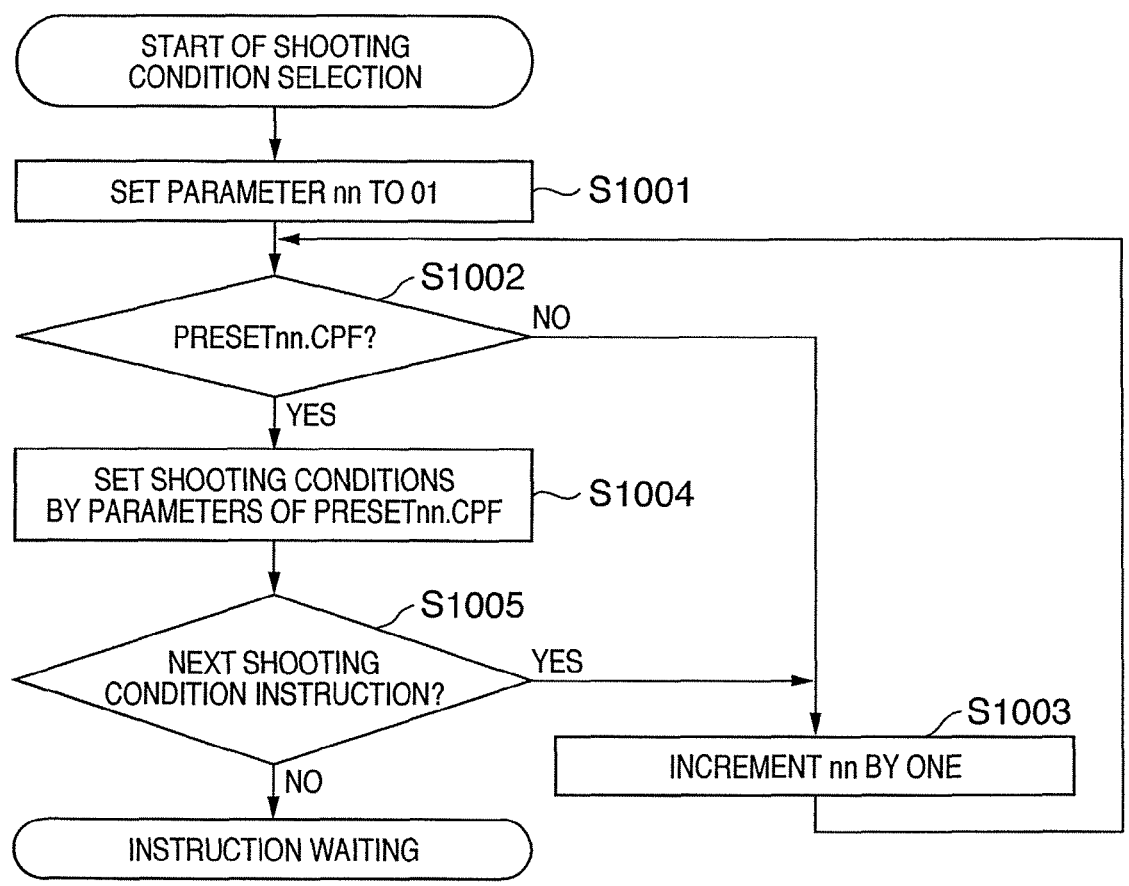
FIG. 6 is a flowchart showing a shooting condition selection operation.

FIG. 6 is a flowchart showing a shooting condition selection operation.

Referring to FIG. 6, when shooting condition selection starts, a numerical parameter nn is set to 1 in step S1001 to confirm whether PRESET01.CPF exists (S1002). If NO in step S1002, the numerical parameter is incremented by one (S1003). It is confirmed whether the next PRESET02.CPF exists (S1002). Steps S1002 and S1003 are repeated. If the file of interest exists, shooting conditions are set by its parameters (S1004). If the apparatus has received a next shooting condition selection instruction from the user (S1005), the flow returns to step S1003 to increment the numerical parameter by one. It is confirmed whether the next shooting condition file exists.

According to the above embodiment, various parameters of shooting conditions are set, and shooting conditions under which a desired image can be obtained are saved in association with image data and registered as shooting conditions selectable in another shooting. This makes it possible to easily re-set shooting conditions in shooting.

Second Embodiment

Figure 7:
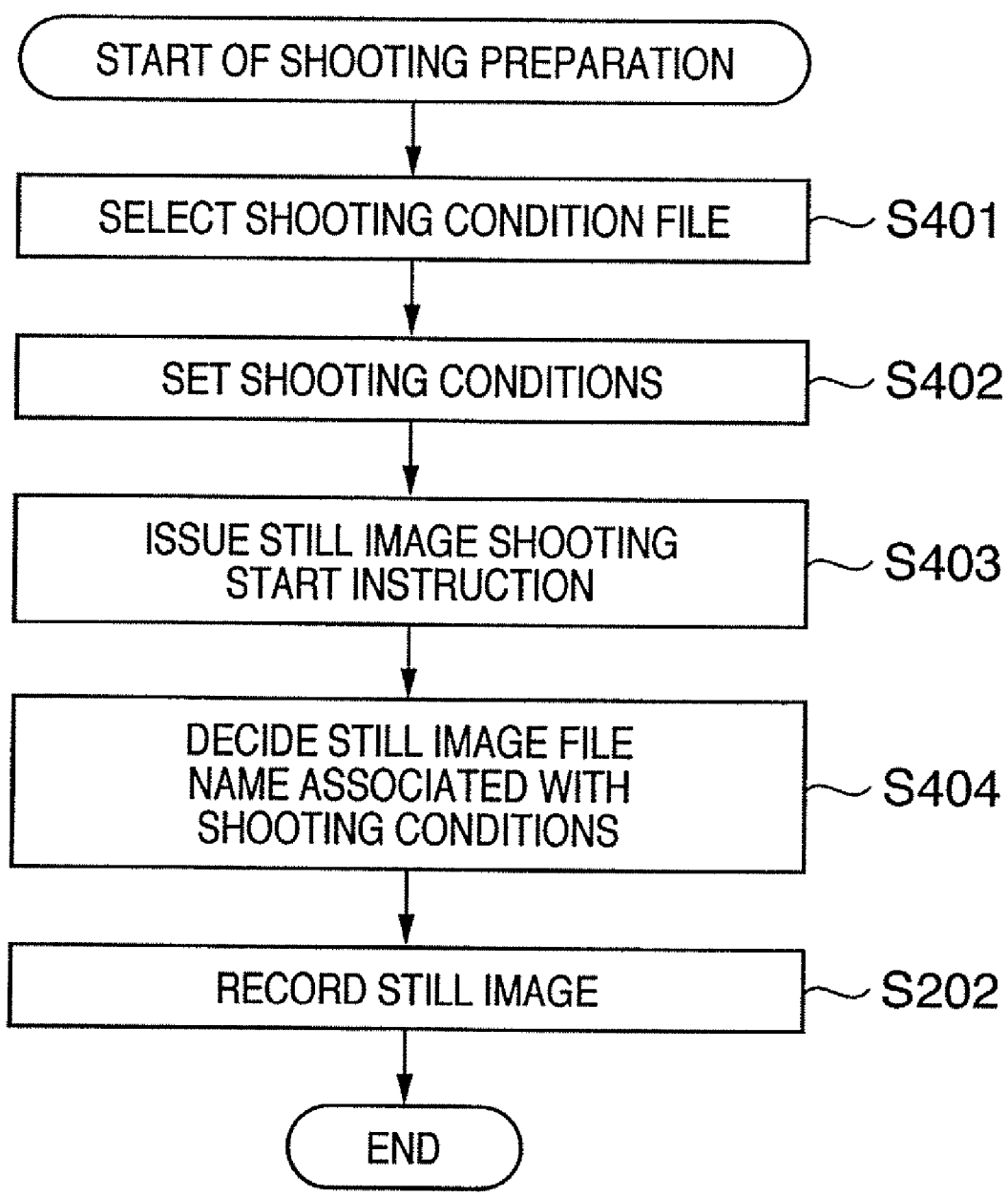
FIG. 7 is a flowchart showing an image data/shooting condition recording operation according to the second embodiment of the present invention.

FIG. 7 is a flowchart showing an image data/shooting condition recording operation according to the second embodiment of the present invention. This embodiment is implemented using an image pickup apparatus with an arrangement similar to that in FIG. 1.

Referring to FIG. 7, a previously recorded shooting condition file is selected (S401). The shooting conditions of the image pickup apparatus are set by the data of the shooting condition file selected in step S401 (S402). After that, the user issues an image shooting instruction to cause the apparatus to shoot an image (in this case, a still image) (S403). Of character strings in the file name of the shooting condition file selected in step S401, the picked-up image file name is decided using a character string which allows that file to be discriminated from the other files (S404). The image is recorded using the file name decided in step S404.

In FIG. 7, a shift to step S404 may be triggered by a moving image shooting start instruction instead of step S403. Alternatively, the shift to step S404 may be triggered by the start of moving image shooting of the first time after change in shooting conditions.

Figure 8:
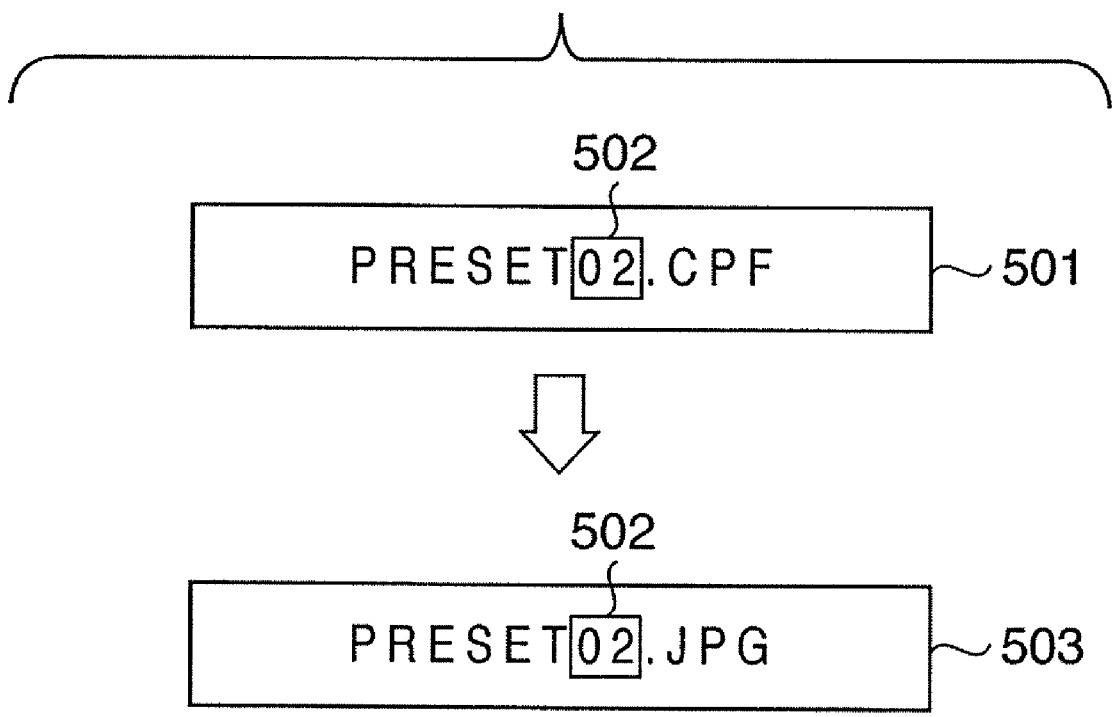
FIG. 8 is a view illustrating a rule to decide an image file name associated with shooting conditions in step S404 of FIG. 7.

FIG. 8 illustrates a rule to decide an image file name associated with shooting conditions in step S404 of FIG. 7.

A file name 501 is of the shooting condition file selected in step S401. A character string 502 is a character string to discriminate that file from the other shooting condition files. In this case, the selected file is discriminated from the other files by being given a character string which expresses a numerical value different from them. In step S404 of FIG. 7, a file name 503 can be decided using the character string 502.

Of character strings in the file name 503, characters other than the character string 502 need not always form a fixed character string as long as they indicate that the file of interest is an image file. Hence, changing the characters other than the character string 502 makes it possible to record a plurality of images in association with one shooting condition.

Third Embodiment

Figure 9:
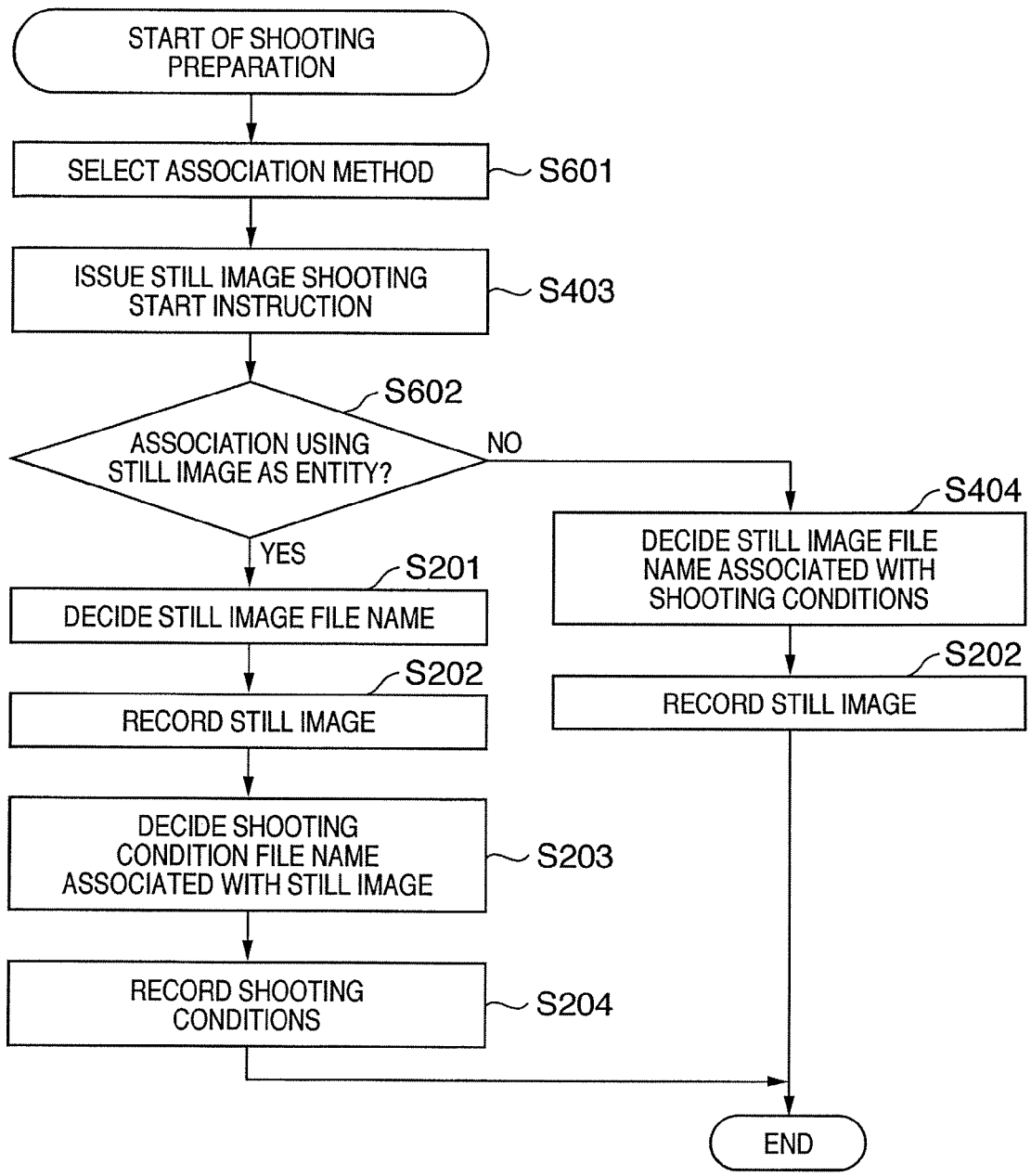
FIG. 9 is a flowchart showing an image data/shooting condition recording operation according to the third embodiment of the present invention.

FIG. 9 is a flowchart showing an image data/shooting condition recording operation according to the third embodiment of the present invention. This embodiment is also implemented using an image pickup apparatus with an arrangement similar to that in FIG. 1.

In the third embodiment, the user can select a method of recording image data and shooting conditions in association with each other. The same reference numerals as in the first and second embodiments denote the same processes in FIG. 9, and a description thereof will be omitted. Only the differences from the first and second embodiments will be described below.

In FIG. 9, a method of associating image data and shooting conditions at the start of shooting preparation includes a method which uses an image file as an entity and a method which uses a shooting condition file as an entity. The former is a method of deciding the shooting condition file name by using an image file as an entity (FIG. 2). The latter is a method of deciding the image file name by using a selected shooting condition file as an entity (FIG. 7). One of the two methods is selected in step S601.

When an image recording instruction is issued in step S403, it is determined in step S602 which of the recording method that uses an image file as an entity and the recording method that uses a shooting condition file as an entity is selected. If it is determined that the recording method which uses an image file as an entity has been selected in step S602, the flow shifts to step S201. If it is determined that the recording method which uses a shooting condition file as an entity has been selected in step S602, the flow shifts to step S404. The file name is decided in accordance with the corresponding rule to record the image data and shooting conditions.

Fourth Embodiment

Figure 10:
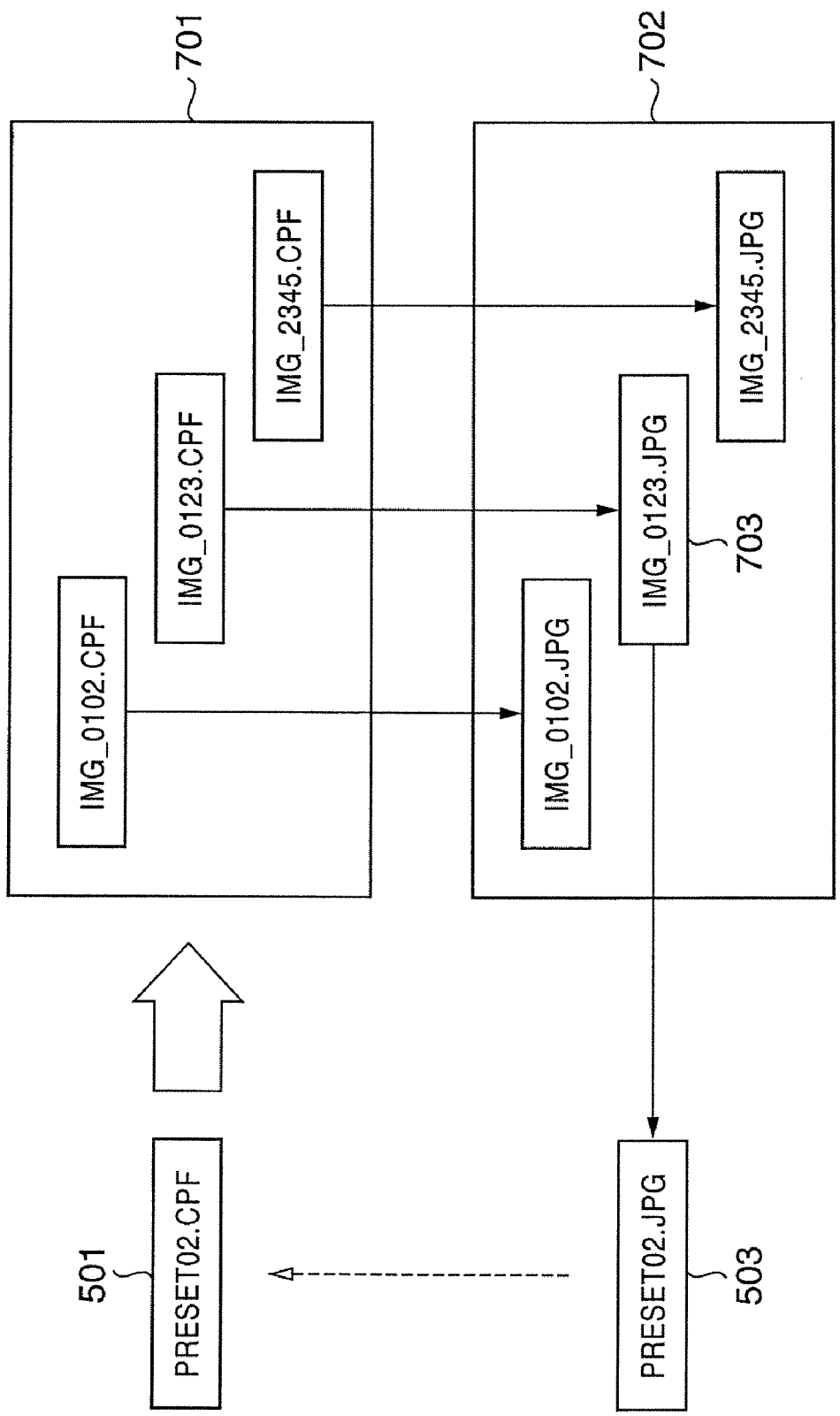
FIG. 10 is a diagram illustrating a method of selecting an image file corresponding to a shooting condition file according to the fourth embodiment of the present invention.

FIG. 10 is illustrates a method of selecting an image file corresponding to a shooting condition file according to the fourth embodiment of the present invention.

A shooting condition file 501 is selected in step S401 of FIG. 7. A shooting condition file group 701 is obtained by extracting files having the same contents as those of the shooting condition file 501 from shooting condition files recorded by the method in FIG. 2 of deciding the shooting condition file name by using an image file as an entity. Image files 702 are associated with the corresponding shooting condition files in the shooting condition file group 701.

The user can select, e.g., an image file 703 from the image file group 702 to change its file name to a name using the file name of the shooting condition file 501. This makes it possible to shift the flow to the method in FIG. 7 of deciding the image file name by using a shooting condition file as an entity.

With this method, image files corresponding to shooting conditions are almost unlimitedly recorded. This makes it possible to select an image file corresponding to a shooting condition file to be selected in shooting from that recorded files. Hence, a more appropriate image can be presented to the user when he/she remembers the shooting conditions of interest.

The characteristic feature of the following embodiments resides in that shooting conditions can be easily selected by selecting associated still image data when shooting condition files generated in the above-described first to fourth embodiments are to be reused in moving image shooting. Another characteristic feature resides in that shooting conditions can be changed even during moving image shooting by temporarily holding shooting condition file data in a memory.

Fifth Embodiment

Figure 11:
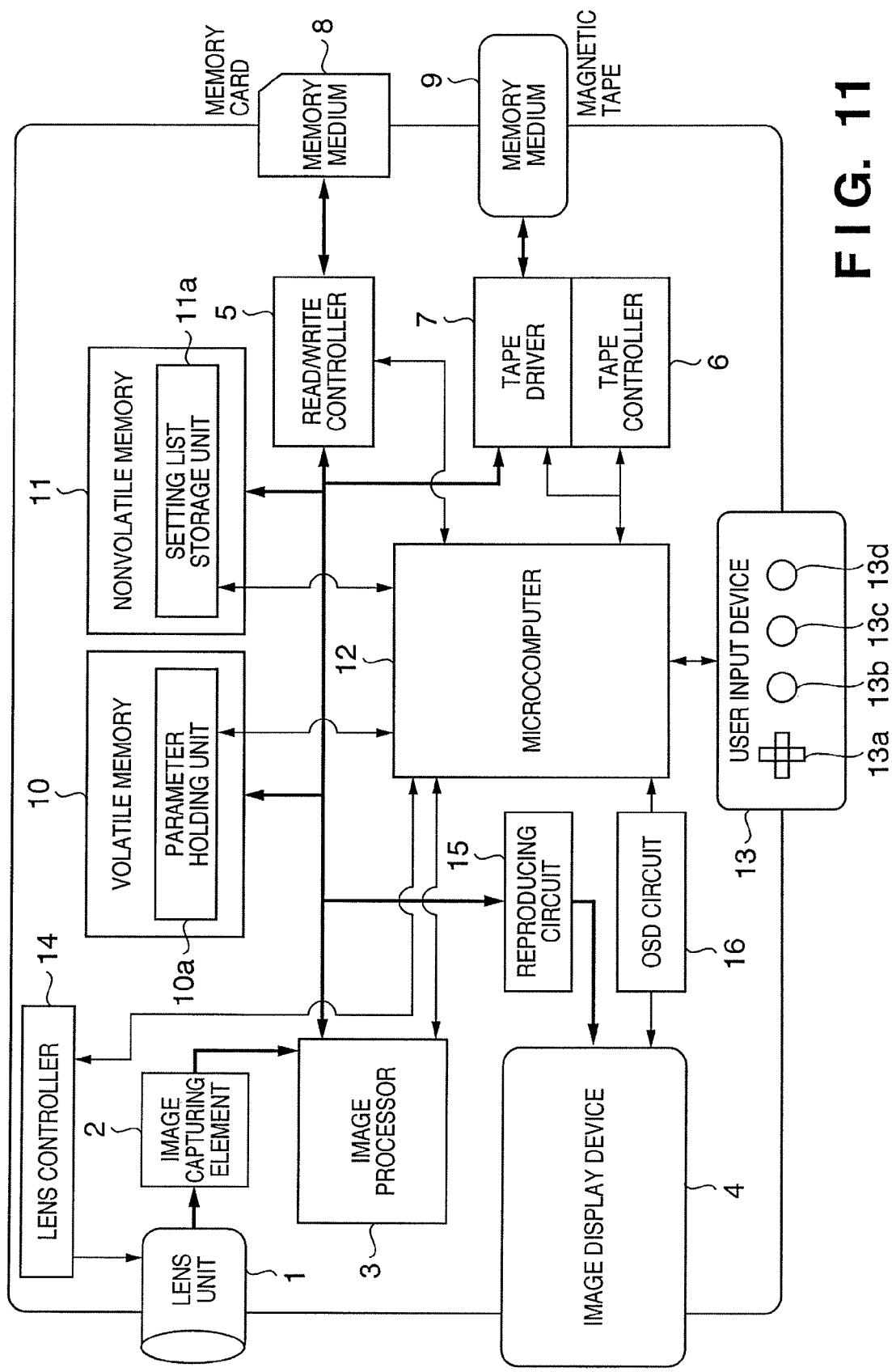
FIG. 11 is a block diagram showing an arrangement for implementing an image pickup apparatus according to the fifth embodiment of the present invention.

FIG. 11 is a block diagram showing an arrangement for implementing an image pickup apparatus according to the fifth embodiment of the present invention.

The image pickup apparatus according to the fifth embodiment comprises a magnetic tape serving as an attachable memory medium 9, a volatile memory 10, and a nonvolatile memory 11, in addition to a memory card serving as a memory medium 8. Data is read/written from/in the memory medium 9 via a tape driver 7 controlled by a tape controller 6.

The volatile memory 10 comprises a parameter holding unit 10a which stores data (to be referred to as parameter data hereinafter) of a moving image shooting parameter setting file. The nonvolatile memory 11 comprises a setting list storage unit 11a which stores parameter data. Details of the data held in these memories will be described later. The other constituent components are the same as those in FIG. 1, and a description thereof will be omitted.

Figure 12:
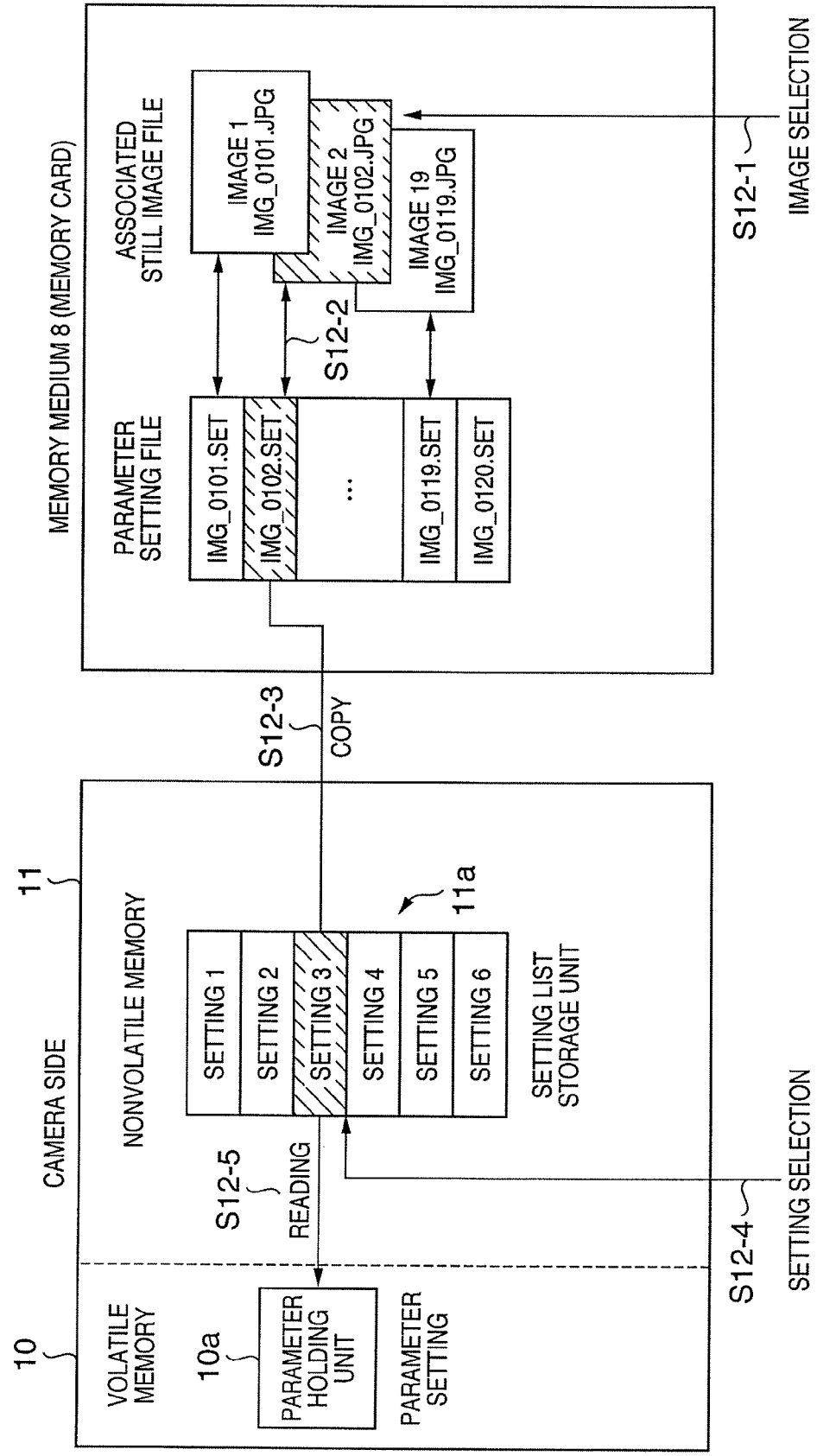
FIG. 12 is a view for explaining the data flow in selecting and setting moving image shooting parameters in the fifth embodiment according to the present invention.

The data flow in selecting and setting moving image shooting parameters will be described next with reference to FIG. 12.

In this embodiment, an image associated with a parameter setting file via a parameter selection window can be reproduced while the camera is ready to read out data from the memory medium 8. In the following embodiments, a shooting condition file is called a parameter setting file and the extension of a file name is "SET". The memory medium 8 stores twenty parameter setting files (IMG_0101.SET to IMG_0120.SET). Assume that files having character strings 0101, 0102, and 0119 are associated with image 1 (IMG_0101.JPG), image 2 (IMG_0102.JPG), and image 19 (IMG_0119.JPG), respectively.

When the user selects an image selection menu via a menu key 13b and parameter selection window, images 1, 2, and 19 are reproduced. If image 2 "IMG_0102.JPG" is selected (S12-1), a parameter setting file "IMG_0102.SET" associated with it is automatically selected (S12-2). This parameter data is copied on the setting list storage unit 11a which exists on the camera-side nonvolatile memory 11 (S12-3). Assuming that the setting list storage unit 11a as a copy destination has six areas, copy target data is overwritten on data in a previously decided area. In this case, that data is copied on the area of setting 3.

If the user selects setting 3 in the setting list while the memory medium 8 or 9 records or when it is ready to record moving image data (S12-4), parameter data of setting 3 is expanded on the parameter holding unit 10a on the volatile memory 10 (S12-5). The expanded data is set as a parameter for moving image shooting using a microcomputer 12.

Figure 16:
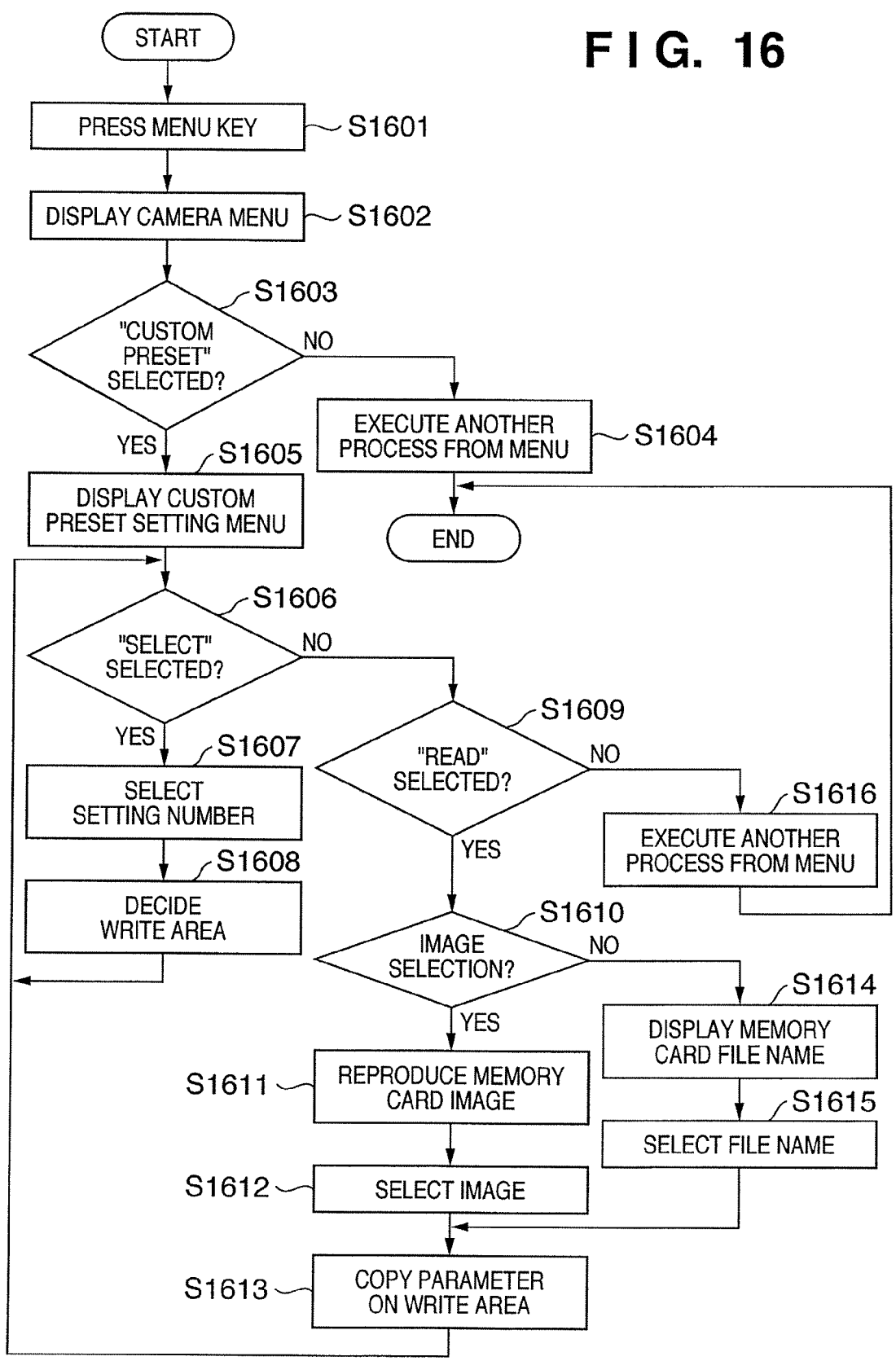
FIG. 16 is a flowchart showing an operation for copying a parameter setting file from a memory medium on a camera-side memory.

An operation for copying a parameter setting file from the memory medium 8 on the setting list storage unit 11a on the camera-side memory 11 will be described next with reference to the flowchart in FIG. 16 and user interface windows in FIGS. 18A to 18G.

A case wherein a parameter setting file "IMG_0102.SET" is registered in setting 3 in the setting list storage unit 11a will be exemplified below.

Figure 18B:
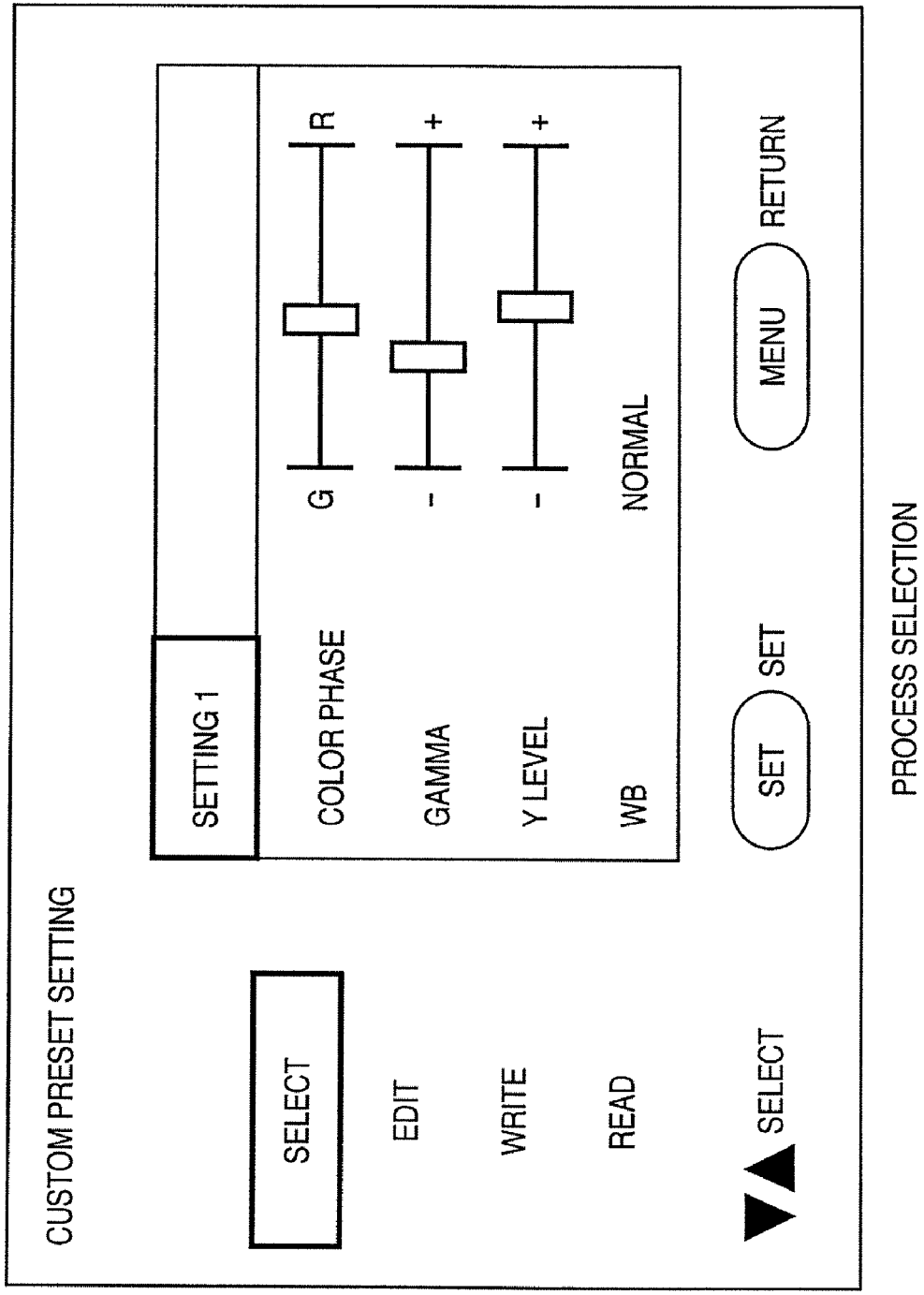

Referring to FIGS. 16 and 18A to 18G, when the menu key 13b is pressed in step S1601 while the apparatus is ready to read out data from the memory medium 8, a camera menu is displayed in step S1602 (FIG. 18A). In step S1603, a cursor is pointed to "Custom preset" by moving a cross key 13a up and down on the camera menu window, and a set key 13c is pressed in the cursor-pointed state. A custom preset setting menu is displayed in step S1605 (FIG. 18B). To execute another operation from the camera menu window, the process involved is performed in step S1604.

In the custom preset setting menu, if the set key 13c is pressed while the cursor is pointed to "Select" (S1606), a setting number becomes selectable by moving the cross key 13a up and down in step S1607 (FIG. 18C). When the set key 13c is pressed while setting 3 is displayed on a custom preset setting menu window, the contents of setting 3 are displayed.

At this time, the set key 13c is pressed while the cursor is pointed to "Write" on the custom preset setting menu window. With this operation, an area on which parameter data in the setting list storage unit 11a on the memory 11 is to be copied is decided (S1608).

In order to register the parameter data in the memory medium 8 in setting 3, in step S1609, the cursor is pointed to "Read" on a custom preset setting menu window and the set key 13c is pressed (FIG. 18D). At this time, "Image selection" is selected in step S1610 although there are two parameter setting file selection methods, i.e., file name selection and image selection (FIG. 18E).

Figure 18G:
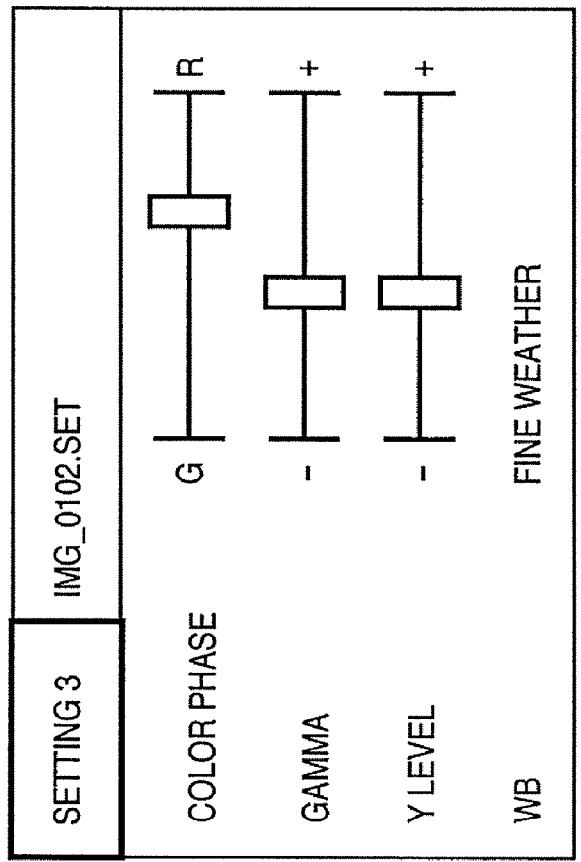

In step S1611, an image file selection window is displayed while displaying a still image associated with a parameter setting file recorded on the memory medium 8 (FIG. 18F). The still image is reproduced by moving the cross key 13a up and down. When the set key 13c is pressed during reproduction of "IMG_0102.JPG" associated with "IMG_0102.SET" in step S1612, parameter data is copied on the write area decided in step S1608, thus completing registration (S1613). At this time, the contents of parameter data of "IMG_0102.SET" registered in setting 3 are displayed on a custom preset setting menu window (FIG. 18G). On the other hand, if file name selection is made in step S1610, the file name of interest is displayed in step S1614. When a desired file is selected via the set key 13c in step S1615, parameter data is copied on the write area decided in step S1608, thus completing registration (S1613).

To execute another operation from the custom preset setting menu window in step S1609, the process involved is performed in step S1616.

Figure 17:
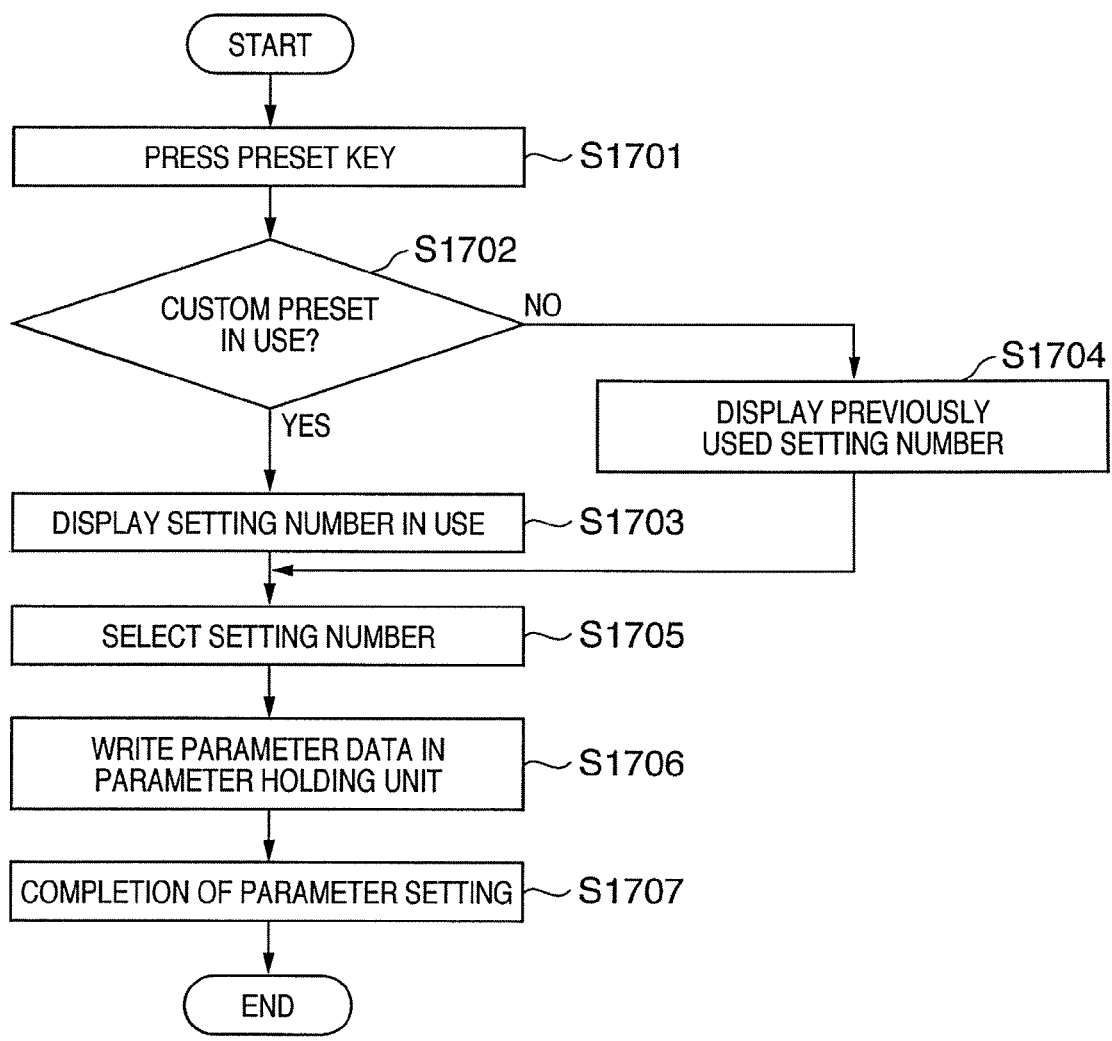
FIG. 17 is a flowchart showing an operation for reading out parameter data during moving image shooting to set that data as moving image shooting parameters.

An operation for reading out parameter data in setting 3 during moving image shooting and setting it as a moving image shooting parameter will be described next with reference to the flowchart in FIG. 17 and user interface windows in FIGS. 19A to 19C.

Figure 19B:
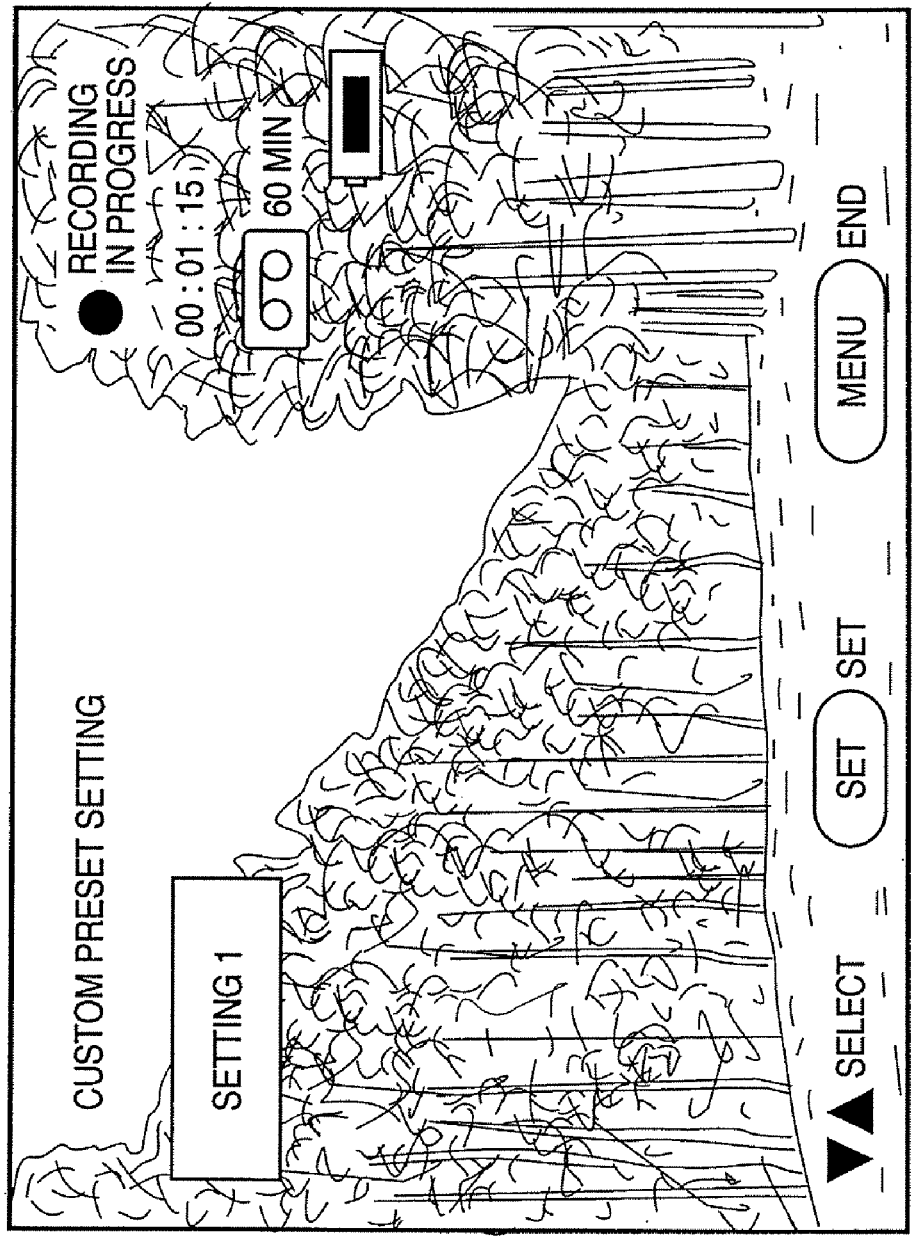

Referring to FIGS. 17 and 19A to 19C, when a preset key 13d is pressed in step S1701 during moving image shooting (FIG. 19A), if it is found in step S1702 that the custom preset setting is currently used, the current setting number is displayed in step S1703 (FIG. 19B). If the custom preset setting is not used, a previously used setting number is displayed in step S1704. In step S1705, setting 3 to be used at this time is selected by moving the cross key 13a up and down and decided via the set key 13c. In step S1706, parameter data is written in the parameter holding unit 10a on the camera-side memory 10. In step S1707, parameter setting for moving image shooting using the microcomputer 12 is completed (FIG. 19C).

According to the above embodiment, in moving image shooting parameter setting, parameters desired to be set can be easily selected by selecting a still image associated with it. Furthermore, parameter data is temporarily held in a memory so as to display only the parameter setting list name during moving image shooting. Change in setting can thus be made.

Sixth Embodiment

Figure 13:
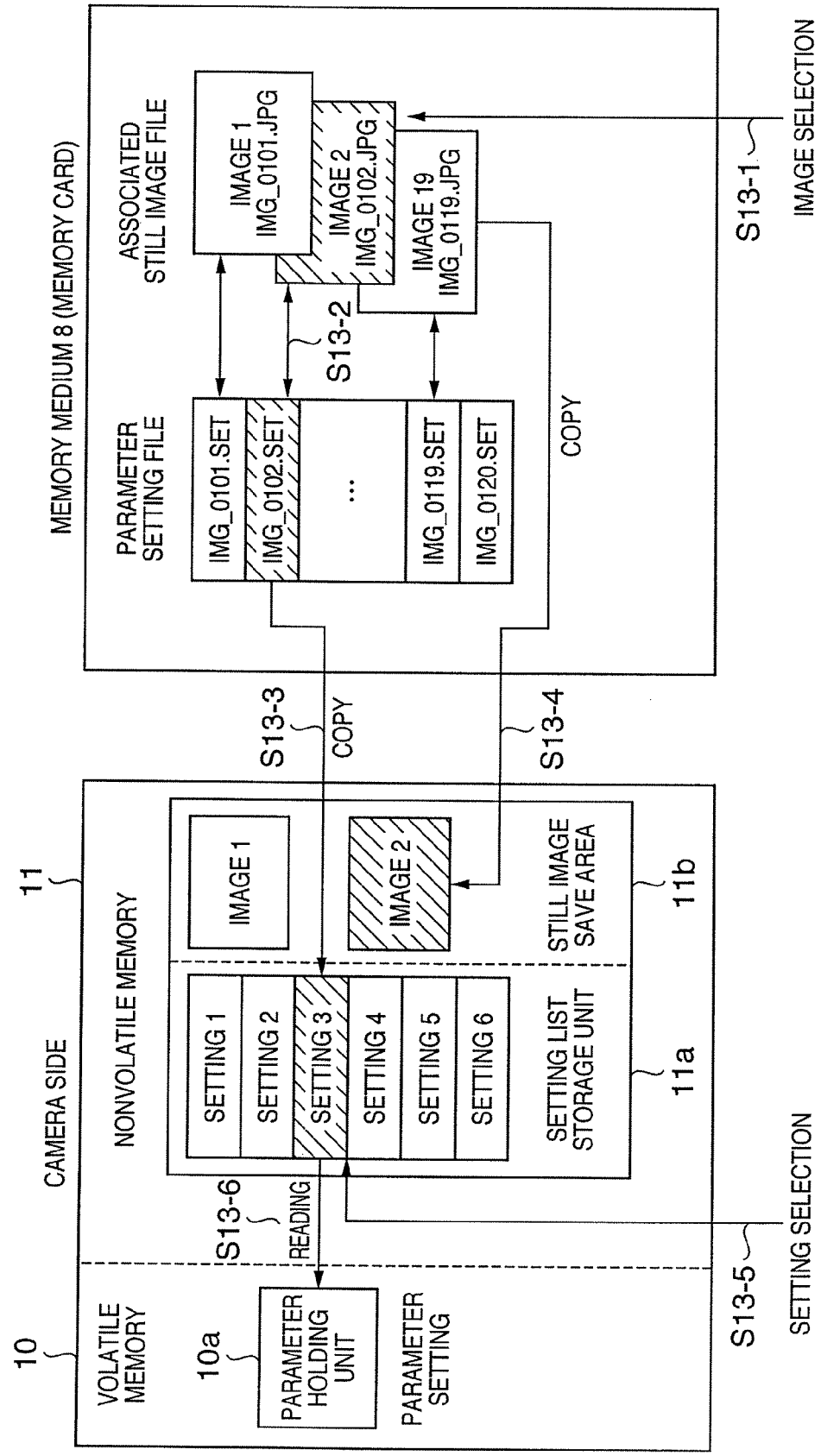
FIG. 13 is a view for explaining the data flow in selecting and setting moving image shooting parameters in the sixth embodiment according to the present invention.

The data flow in selecting and setting moving image shooting parameters according to the sixth embodiment of the present invention will be described next with reference to FIG. 13. The sixth embodiment is implemented using a camera with an arrangement similar to that in the fifth embodiment.

In the following description, like the fifth embodiment, a memory medium 8 stores twenty parameter setting files (IMG_0101.SET to IMG_0120.SET). Assume that files having character strings 0101, 0102, and 0119 are associated with image 1 (IMG_0101.JPG), image 2 (IMG_0102.JPG), and image 19 (IMG_0119.JPG), respectively.

When the user selects an image selection menu via a menu key 13b and parameter selection window, images 1, 2, and 19 are reproduced. If image 2 "IMG_0102.JPG" is selected (S13-1), a parameter setting file "IMG_0102.SET" associated with it is automatically selected (S13-2). This parameter data is copied on a setting list storage unit 11a which exists on a camera-side nonvolatile memory 11 (S13-3). Data of image 2 selected is copied on a still image save area 11b which exists on the nonvolatile memory 11 (S13-4). At this time, the copied parameter data and image data keep association with each other. Assuming that the setting list storage unit 11a as a copy destination has six areas, copy target data is overwritten on data in a previously decided area. In this case, that data is copied on the area of setting 3.

The user selects setting 3 in the setting list while the memory medium 8 or a memory medium 9 records or when it is ready to record moving image data (S13-5). Parameter data of setting 3 is expanded on a parameter holding unit 10a on a volatile memory 10 (S13-6). The expanded data is set as a parameter for moving image shooting using a microcomputer 12.

According to the above embodiment, in addition to the effect of the fifth embodiment, a parameter setting file and image data associated with each other are temporarily held in a memory so as to display the parameter setting list name and an image associated with it during moving image shooting. Change in setting can thus be made.

Seventh Embodiment

Figure 14:
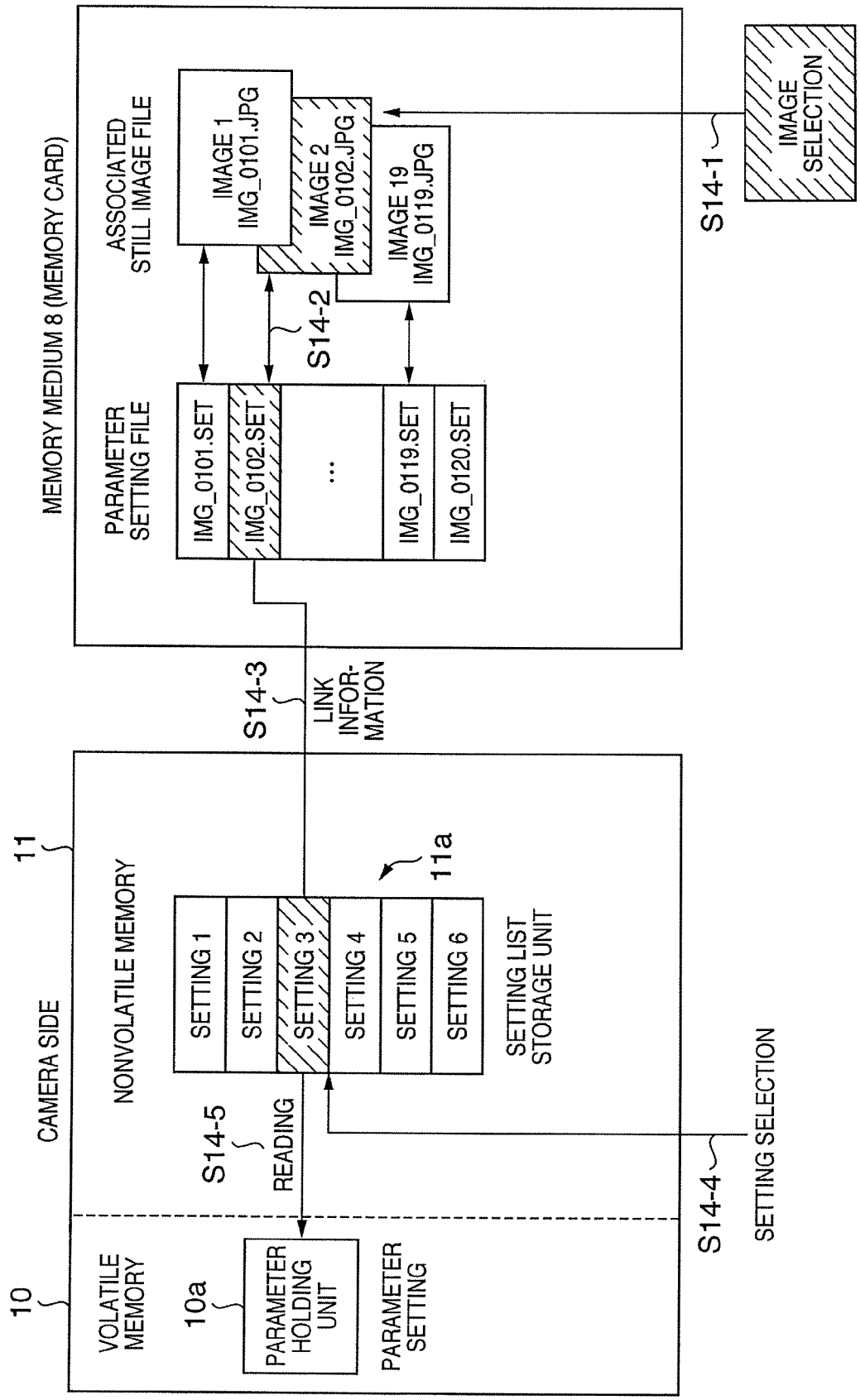
FIG. 14 is a view for explaining the data flow in selecting and setting moving image shooting parameters in the seventh embodiment according to the present invention.

The data flow in selecting and setting moving image shooting parameters according to the seventh embodiment of the present invention will be described next with reference to FIG. 14. The seventh embodiment is implemented using a camera with an arrangement similar to that in the fifth embodiment.

In the following description, like the fifth embodiment, a memory medium 8 stores twenty parameter setting files (IMG_0101.SET to IMG_0120.SET). Assume that files having character strings 0101, 0102, and 0119 are associated with image 1 (IMG_0101.JPG), image 2 (IMG_0102.JPG), and image 19 (IMG_0119.JPG), respectively.

When the user selects an image selection menu via a menu key 13b and parameter selection window, images 1, 2, and 19 are reproduced. If image 2 "IMG_0102.JPG" is selected (S14-1), a parameter setting file "IMG_0102.SET" associated with it is automatically selected (S14-2). Link information to this parameter setting file is registered in a setting list storage unit 11a which exists on a camera-side nonvolatile memory 11 (S14-3). Assuming that the setting list storage unit 11a as a registration destination has six areas, link information is overwritten on data in a previously decided area. In this case, that data is linked to the area of setting 3.

The user selects setting 3 in the setting list while the memory medium 8 or a memory medium 9 records or when it is ready to record moving image data (S14-4). Parameter data at the link destination of setting 3 is expanded on a parameter holding unit 10a on a volatile memory 10 (S14-5). The expanded data is set as a parameter for moving image shooting using a microcomputer 12.

According to this embodiment, in addition to the effect of the fifth embodiment, link information to a parameter setting file is temporarily held in a memory so as to decrease the amount of data to be stored in the memory.

Eighth Embodiment

Figure 15:
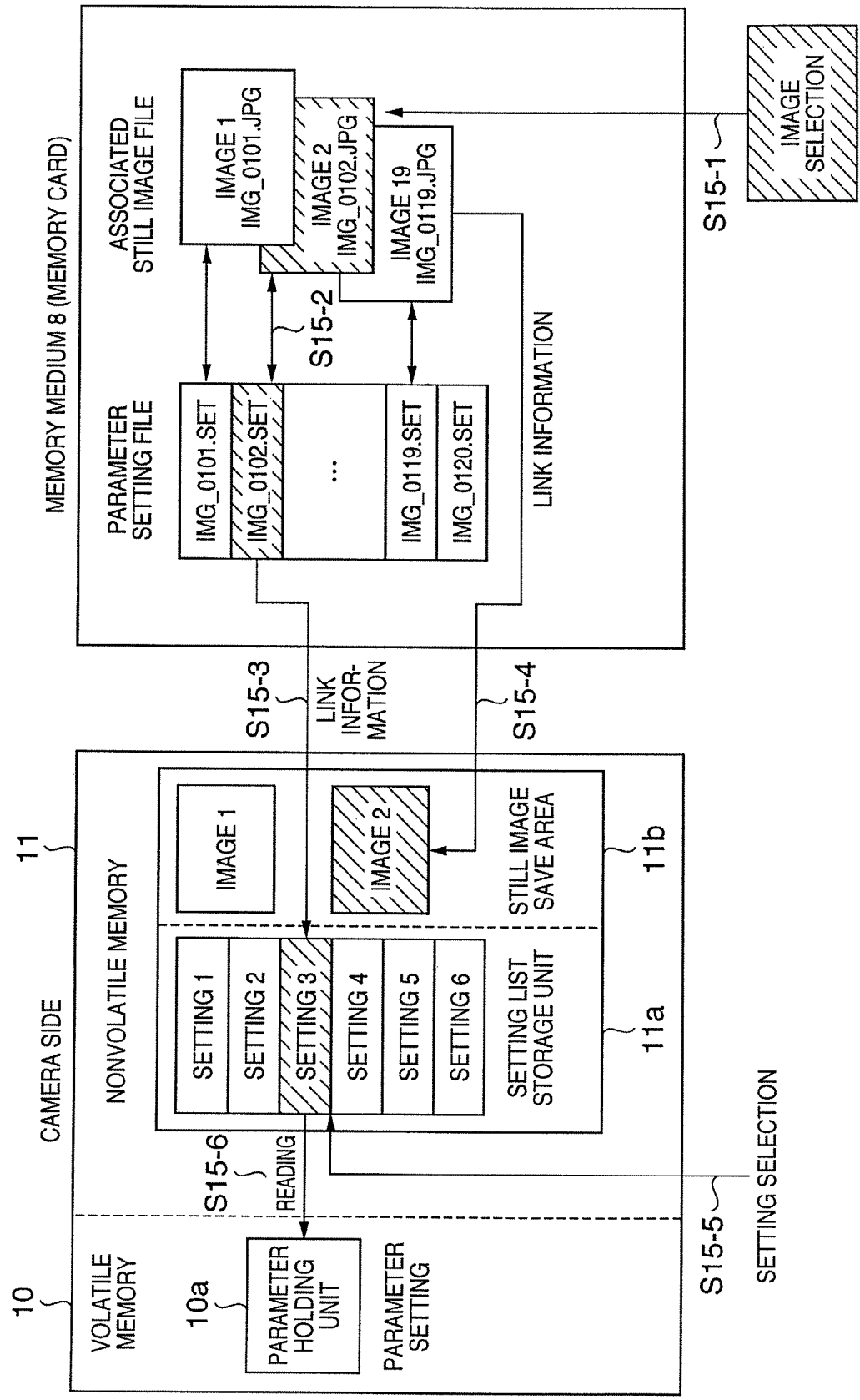
FIG. 15 is a view for explaining the data flow in selecting and setting moving image shooting parameters in the eighth embodiment according to the present invention.

The data flow in selecting and setting moving image shooting parameters according to the eighth embodiment of the present invention will be described next with reference to FIG. 15. The eighth embodiment is implemented using a camera with an arrangement similar to that in the fifth embodiment.

In the following description, like the fifth embodiment, a memory medium 8 stores twenty parameter setting files (IMG_0101.SET to IMG_0120.SET). Assume that files having character strings 0101, 0102, and 0119 are associated with image 1 (IMG_0101.JPG), image 2 (IMG_0102.JPG), and image 19 (IMG_0119.JPG), respectively.

When the user selects an image selection menu via a menu key 13b and parameter selection window, images 1, 2, and 19 are reproduced. If image 2 "IMG_0102.JPG" is selected (S15-1), a parameter setting file "IMG_0102.SET" associated with it is automatically selected (S15-2). Link information to this parameter setting file is registered in a setting list storage unit 11a which exists on a camera-side nonvolatile memory 11 (S15-3). Link information to image 2 selected is registered in a still image save area 11b which exists on the nonvolatile memory 11 (S15-4). At this time, the registered link information and image data keep association with each other. Assuming that the setting list storage unit 11a as a registration destination has six areas, link information is overwritten on data in a previously decided area. In this case, that data is linked to the area of setting 3.

The user selects setting 3 in the setting list while the memory medium 8 or a memory medium 9 records or when it is ready to record picked-up image data (S15-5). Parameter data at the link destination of setting 3 is expanded on a parameter holding unit 10a on a volatile memory 10 (S15-6). The expanded data is set as a parameter for moving image shooting using a microcomputer 12.

According to this embodiment, in addition to the effect of the fifth embodiment, link information to a parameter setting file and image data associated with each other are temporarily held in a memory so as to decrease the amount of data to be stored in the memory.

Other Embodiment

The embodiments according to the present invention have been described in detail above while showing concrete examples. However, the present invention can be practiced as, e.g., a system, apparatus, method, program, or storage medium (recording medium). More specifically, the present invention may be applied to a system constituted by a plurality of devices or an apparatus comprising a single device.

The object of the present invention is achieved even by implementing any portions in functional blocks and operations in the accompanying drawings by hardware circuits or software processing using a computer.

The present invention is also achieved even by supplying a software program which implements the functions of the above-described embodiments to the system or apparatus directly or from a remote site. In this case, a computer such as a system reads out and executes the supplied program code.

Hence, to implement the functional processing of the present invention by a computer, the program code itself, which is installed in the computer, also implements the present invention. That is, a computer program itself, which implements the functional processing of the present invention, is also incorporated in the claim of the present invention.

In this case, the program can take any form such as an object code, a program to be executed by an interpreter, or script data to be supplied to the OS as long as the functions of the program can be obtained.

As a recording medium (storage medium) to supply the program, for example, a flexible disk, hard disk, optical disk, or magnetooptical disk can be used. Alternatively, MO, CD-ROM, CD-R, CD-RW, magnetic tape, nonvolatile memory card, ROM, or DVD (DVD-ROM or DVD-R) can be used.

As another program supply method, a client computer may be connected to a homepage on the Internet using a browser in the computer, and the computer program itself of the present invention or a compressed file containing an automatic install function may be downloaded from the homepage to a recording medium such as a hard disk. A program code that constitutes the program of the present invention may be divided into a plurality of files, and the files may be downloaded from different homepages. That is, a WWW server which causes a plurality of users to download a program file that causes a computer to implement the functional processing of the present invention is also incorporated in the claim of the present invention.

The program of the present invention may be encrypted, stored in a storage medium such as a CD-ROM, and distributed to users. Any user who satisfies predetermined conditions may be allowed to download key information for decryption from a homepage through the Internet. In this case, the encrypted program is executed using the key information, and installed in the computer to implement the present invention.

The functions of the above-described embodiments are implemented not only when the readout program is executed by the computer but also when the OS or the like, which is running on the computer, performs part or all of actual processing on the basis of the instructions of the program.

The functions of the above-described embodiments are also implemented when the program read out from the storage medium is written in the memory of a function expansion board inserted into the computer or a function expansion unit connected to the computer, and the CPU of the function expansion board or function expansion unit performs part or all of actual processing on the basis of the instructions of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Application No. 2005-221465, filed Jul. 29, 2005, which is hereby incorporated by reference herein in its entirety.

What is claimed is:

1. An image pickup apparatus comprising:
    an image pickup unit adapted to pickup a moving image and a still image;
    a control unit adapted to store the still image and a shooting parameter set of the still image as a separate file in a detachable storage medium, the shooting parameter set being associated with the still image obtained at a still image shooting and the shooting parameter set including a group of setting values of a plurality of items of shooting conditions;
    a shooting parameter storage unit adapted to store a plurality of shooting parameter sets which are used at the still image shooting in said image pickup apparatus;
    an instruction unit adapted to issue an instruction to register the shooting parameter set of the still image while the still image is read out from the detachable storage medium and displayed;
    a registration unit adapted to copy and register a file of the shooting parameter set associated with the still image in a shooting parameter storage unit of the image pickup apparatus on the basis of the instruction for registering the shooting parameter set;
    a display unit adapted to display information associated with the file of the shooting parameter sets stored in said shooting parameter storage unit;
    a selection unit adapted to select a desired file of the shooting parameter set from information displayed on said display unit; and
    a setting unit adapted to set the shooting parameter set selected by said selection unit.

2. The apparatus according to claim 1, wherein said display unit displays identification information stored in association with the shooting parameter set.

3. The apparatus according to claim 1, wherein the file of the shooting parameter set and an image file which stores the still image are stored in correspondence with a file name involved.

4. The apparatus according to claim 1, wherein said shooting parameter storage unit includes a holding unit adapted to hold data of a plurality of shooting parameter sets read out from said shooting parameter storage unit, and selects data held in said holding unit to set the shooting parameter set.

5. An image pickup method comprising:
    an image pickup step which picks up a moving image and a still image;
    a control step of storing the still image and a shooting parameter set of the still image as a separate file in a detachable storage medium, the shooting parameter set being associated with the still image obtained at a still image shooting and the shooting parameter set including a group of setting values of a plurality of items of shooting conditions;
    a shooting parameter set storage step of causing a storage unit to store a plurality of shooting parameter sets which are used at the still image shooting in the image pickup step;
    an instruction step of issuing an instruction to register the shooting parameter set of the still image while the still image is read out from the detachable storage medium and displayed;
    a registration step of copying and registering a file of the shooting parameter set associated with the still image in a shooting parameter storage unit on the basis of the instruction for registering the shooting parameter set;
    a display step of displaying information associated with the file of the shooting parameter sets stored in the storage unit;
    a selection step of selecting a desired file of the shooting parameter sets from information displayed in the display step; and
    a setting step of setting the shooting parameter set selected in the selection step.

6. The method according to claim 5, wherein identification information stored in association with the shooting parameter set is displayed in the display step.

7. The method according to claim 5, wherein the file of the shooting parameter set and an image file which stores the still image are stored in correspondence with a file name involved.

8. The method according to claim 5, wherein the shooting parameter set storage step includes a holding step of holding data of a plurality of shooting parameter sets read out from the shooting parameter set storage unit, and selects data held in the holding step to set the shooting parameter set.

9. A non-transitory computer-readable storage medium storing a program for causing a computer to execute an image pickup method defined in claim 5.

* * * * *